United States Patent
Du et al.

(10) Patent No.: US 10,425,513 B2
(45) Date of Patent: Sep. 24, 2019

(54) METHOD AND DEVICE FOR INDICATING TRANSMISSION FRAME STRUCTURE, AND SYSTEM

(71) Applicant: HUAWEI TECHNOLOGIES CO., LTD., Shenzhen, Guangdong (CN)

(72) Inventors: Zhenguo Du, Shenzhen (CN); Zhigang Rong, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 15/655,928

(22) Filed: Jul. 21, 2017

(65) Prior Publication Data
US 2017/0318134 A1 Nov. 2, 2017

Related U.S. Application Data

(63) Continuation of application No. PCT/CN2015/099270, filed on Dec. 28, 2015.

(30) Foreign Application Priority Data

Jan. 22, 2015 (CN) .................. PCT/CN2015/071329

(51) Int. Cl.
*H04L 29/08* (2006.01)
*H04L 27/26* (2006.01)
(Continued)

(52) U.S. Cl.
CPC ......... *H04L 69/324* (2013.01); *H04B 7/0452* (2013.01); *H04L 5/0007* (2013.01);
(Continued)

(58) Field of Classification Search
CPC ... H04L 69/324; H04L 5/0091; H04L 5/0007; H04L 69/22; H04L 27/26; H04B 7/0452; H04W 84/12; H04W 72/12
See application file for complete search history.

(56) References Cited

U.S. PATENT DOCUMENTS

2007/0140296 A1 6/2007 Koppelaar et al.
2009/0252257 A1 10/2009 Sadowsky et al.
(Continued)

FOREIGN PATENT DOCUMENTS

CA 2908045 A 10/2014
CN 1809994 A 7/2006
(Continued)

OTHER PUBLICATIONS

Song Jaeyoung et al.,"Considerations on 11ax Auto-detection Methods",IEEE 802.11-14/0081r0,dated Jan. 12, 2015,total 17 pages.
(Continued)

*Primary Examiner* — Feben Haile
(74) *Attorney, Agent, or Firm* — Huawei Technologies Co., Ltd.

(57) ABSTRACT

A method for indicating a frame structure in a wireless local area network (WLAN) is provided. A sending device generates a transmission frame. The transmission frame includes a physical header. The physical header includes a frame structure indication. A subcarrier polarity of the frame structure indication is used to indicate a frame structure of the transmission frame. The sending device sends the transmission frame to a receiving device. In the transmission frame, a first subcarrier polarity indicates the transmission frame has a first frame structure, in which the physical header includes a field and a time domain repetition of the field; and a second subcarrier polarity indicates the transmission frame has a second frame structure, in which the physical header includes the field but does not include the time domain repetition of the field. The frame structure indication is an orthogonal frequency division multiplexing (OFDM) symbol.

22 Claims, 9 Drawing Sheets

(51) Int. Cl.
*H04W 72/12* (2009.01)
*H04B 7/0452* (2017.01)
*H04L 5/00* (2006.01)
*H04L 29/06* (2006.01)
*H04W 84/12* (2009.01)

(52) U.S. Cl.
CPC ............ *H04L 5/0091* (2013.01); *H04L 27/26* (2013.01); *H04L 69/22* (2013.01); *H04W 72/12* (2013.01); *H04W 84/12* (2013.01)

(56) References Cited

U.S. PATENT DOCUMENTS

| | | |
|---|---|---|
| 2010/0272199 A1 | 10/2010 | Hayashi et al. |
| 2011/0110348 A1 | 5/2011 | Lee et al. |
| 2011/0317597 A1 | 12/2011 | Wan et al. |
| 2013/0128806 A1 | 5/2013 | Vermani et al. |
| 2015/0009894 A1 | 1/2015 | Vermani et al. |
| 2016/0088126 A1* | 3/2016 | Doan .................... H04L 69/22 370/329 |
| 2016/0127948 A1 | 5/2016 | Azizi et al. |

FOREIGN PATENT DOCUMENTS

| | | |
|---|---|---|
| CN | 1930843 A | 3/2007 |
| CN | 102282822 A | 12/2011 |
| CN | 102711217 A | 10/2012 |
| CN | 103534966 A | 1/2014 |
| JP | 2017539117 A | 12/2017 |
| KR | 20110050339 A | 5/2011 |
| RU | 2479132 C2 | 4/2013 |
| WO | 2012177993 A1 | 12/2012 |
| WO | 2015003119 A1 | 1/2015 |

OTHER PUBLICATIONS

Luo Zhendong et al.,"The Next-Generation Wireless LAN-High-Efficiency WLAN", Telecommunications Network Technology, No. 9, Sep. 30, 2013, total 6 pages, with English abstract.

Al-Ghazu, Nader,"A study of the next WLAN standard IEEE 802.11ac physical layer", Master of Science Thesis Stockholm, Sweden, dated Jan. 31, 2013, total 59 pages.

XP068082646 Jiayin Zhang(Huawei),"Preamble structure for 11ax system", IEEE 802.11-15/0101r1,dated Jan. 13, 2015,total 18 pages.

Yung-Szu Tu, et al., IEEE 802.11-10/0130r0,Proposed TGac Preamble, Jan. 2010. total 34 pages.

* cited by examiner (a) BPSK constellation diagram (b) QBPSK constellation diagram Structure 1: SU, SU MIMO, DL MU MIMO, DL OFDMA

| | L-STF | L-LTF | L-SIG | X | HE-SIG-A | HE-SIG-B | HE-STF/LTFs | HE-SIG-C | Date (STA1) |
|---|---|---|---|---|---|---|---|---|---|
| 20MHz | L-STF | L-LTF | L-SIG | X | HE-SIG-A | HE-SIG-B | | | |

FIG. 4a

Structure 2: UL MU MIMO, UL OFDMA, DL OFDMA

METHOD AND DEVICE FOR INDICATING TRANSMISSION FRAME STRUCTURE, AND SYSTEM

CROSS-REFERENCE TO RELATED APPLICATIONS

This application is a continuation of International Application No. PCT/CN2015/099270, filed on Dec. 28, 2015, which claims priority to International Application No. PCT/CN2015/071329, filed on Jan. 22, 2015. The disclosures of the aforementioned applications are hereby incorporated by reference in their entireties.

TECHNICAL FIELD

The present application relates to the field of communication technologies, and specifically, to a method and device for indicating a transmission frame structure, and a system.

BACKGROUND

With evolution of a wireless local area network (WLAN) standard, a current IEEE (Institute of Electrical and Electronics Engineers) 802.11 working group starts to research and formulate a next-generation wireless fidelity (WiFi) standard. The next-generation WiFi standard is referred to as a high efficiency WLAN (HEW) for short, and a project code name is 802.11ax. The next-generation WiFi standard aims to increase a system capacity to more than 10 Gbps, and specially concerns an outdoor deployment scenario of WiFi devices and a high-density deployment scenario of WiFi devices.

For a high-density distribution scenario, a competitive access mechanism of conventional WiFi cannot work well due to low efficiency of the competitive access mechanism, and a new media access mechanism is in urgent need of introduction. Therefore, a multiuser transmission technology with an advantage of relatively high performance is very likely to be introduced into 11ax. Orthogonal frequency division multiple access (OFDMA) that includes uplink (UL) OFDMA and downlink (DL) OFDMA may be introduced into 11ax. In addition, uplink multi-user multiple-input multiple-output (UL MU MIMO) may also be introduced (DL MU MIMO has been introduced into 11ac). The 11ax should support all transmission modes supported by an existing standard. Actually, evolution of the WiFi standard always adheres to this idea, which is shown in Table 1.

TABLE 1

| Standard | Supported transmission mode |
|---|---|
| 11a/g | SU (single user) |
| 11n | SU, SU MIMO |
| 11ac | SU, SU MIMO, DL MU MIMO |
| 11ax | SU, SU MIMO, DL MU MIMO, UL MU MIMO, UL/DL OFDMA |

It may be seen from Table 1 that, an 11a/g standard supports a single user (SU) transmission mode, an 11n standard supports the SU transmission mode and an SU MIMO transmission mode, and an 11ac standard supports the SU transmission mode, the SU MIMO transmission mode, and a DL MU MIMO transmission mode. In the related field, each standard has a particular transmission frame structure. A field in a physical header of a transmission frame is used to indicate a frame structure of the transmission frame.

It may be seen from Table 1 that, a frame structure of the 11ax standard not only should support the newly-introduced UL/DL OFDMA and UL MU MIMO, but also should support the existing three transmission modes. In addition, the frame structure of the 11ax should also be identified by a HEW device and an existing device as early as possible. That is, the HEW device can identify the frame as an 11ax transmission frame according to a physical header of a transmission frame; or the existing device can determine, according to a physical header of a transmission frame, that the transmission frame is a transmission frame that cannot be understood by the existing device. Therefore, a frame structure of a transmission frame needs to be indicated in a physical header of the transmission frame.

It is found in practice that, in the related field, a particular frame structure is used in each standard, and a physical header of the frame structure can indicate only this frame structure. However, with development of a WLAN, more transmission modes need to be supported, and multiple frame structures may be designed in one standard. As a result, the solution in the related field cannot satisfy the needs of various applications. For example, the 11ax standard needs to support more than five transmission modes. It is difficult for one frame structure to satisfy this requirement, that is, at least two frame structures may need to be designed to separately support different transmission modes. Therefore, a method for indicating multiple different frame structures is in urgent need.

SUMMARY

Embodiments of the present application provide a method and device for indicating a transmission frame structure, and a system, which can be used to indicate multiple different transmission frame structures, and can be applied to a HEW into which any one or more of transmission modes in a UL OFDMA transmission mode, a DL OFDMA transmission mode, and a UL MU MIMO transmission mode are introduced.

A first aspect of the present application provides a method for indicating a transmission frame structure, where the method is applied to a wireless local area network (WLAN), and includes: generating, by a sending device, a transmission frame, where a physical header of the transmission frame includes a frame structure indication field, a subcarrier polarity of the frame structure indication field is used to indicate a frame structure of the transmission frame, where when the subcarrier polarity of the frame structure indication field is a first subcarrier polarity, the transmission frame has a first frame structure, or when the subcarrier polarity of the frame structure indication field is a second subcarrier polarity, the transmission frame has a second frame structure; and sending the transmission frame, so that a receiving device determines the frame structure of the transmission frame according to the subcarrier polarity of the frame structure indication field.

With reference to the first aspect, in a first possible implementation manner, the frame structure indication field closely follows a legacy signal field (referred to as L-SIG), and the generating, by a sending device, a transmission frame includes: generating, by the sending device, a first transmission frame that has the first frame structure, or generating a second transmission frame that has the second frame structure, where in a physical header of the first transmission frame, there is a high efficiency wireless local area network first signal field (referred to as HE-SIG-A) after an L-SIG and before a high efficiency wireless local area network short training field (referred to as HE-STF), where the HE-SIG-A includes control indication information, the control indication information is used to instruct the receiving device how to decode all or a part of fields in a part that is of the first transmission frame and after the HE-SIG-A, and the first transmission frame is used to support a single user (SU) transmission mode, a single user multiple-input multiple-output (SU MIMO) transmission mode, and a downlink multi-user multiple-input multiple-output (DL MU MIMO) transmission mode; in a physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices that include the sending device superpose, where the second transmission frame is used to support an uplink orthogonal frequency division multiple access (UL OFDMA) transmission mode, and the common information includes at least one of the following information: a network identifier, an identifier of the receiving device, or remaining transmission duration.

With reference to the first possible implementation manner of the first aspect, in a second possible implementation manner, the first transmission frame is further used to support a downlink orthogonal frequency division multiple access (DL OFDMA) transmission mode, or the second transmission frame is further used to support a DL OFDMA transmission mode.

With reference to the first or the second possible implementation manner of the first aspect, in a third possible implementation manner, the first transmission frame is further used to support an uplink multi-user multiple-input multiple-output (UL MU MIMO) transmission mode, or the second transmission frame is further used to support a UL MU MIMO transmission mode.

With reference to any one of the first to the third possible implementation manners of the first aspect, in a fourth possible implementation manner, a high efficiency wireless local area network second signal field (referred to as HE-SIG-B) is further included after the HE-SIG-A of the first transmission frame and before the HE-STF of the first transmission frame, where the HE-SIG-B includes control indication information, and the control indication information included in the HE-SIG-B is used to instruct the receiving device how to decode a part that is of the first transmission frame and after the HE-SIG-B.

With reference to the fourth possible implementation manner of the first aspect, in a fifth possible implementation manner, the HE-SIG-A or the HE-SIG-B of the first transmission frame further includes mode indication information, where the mode indication information is used to indicate a transmission mode specifically supported by the first transmission frame.

With reference to the first aspect or any one of the first to the fifth possible implementation manners of the first aspect, in a sixth possible implementation manner, the generating, by a sending device, a transmission frame includes: generating, by the sending device, a first transmission frame that has the first frame structure, or generating a second transmission frame that has the second frame structure, where after a frame structure indication field, a physical header of the first transmission frame includes a time domain repetition of a particular field; and a physical header of the second transmission frame includes the particular field, but does not include the time domain repetition of the particular field.

With reference to the sixth possible implementation manner of the first aspect, in a seventh possible implementation manner, the particular field is an HE-SIG-A.

With reference to any one of the first aspect or the first to the seventh possible implementation manners of the first aspect, in an eighth possible implementation manner, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG.

With reference to any one of the first aspect or the first to the eighth possible implementation manners of the first aspect, in a ninth possible implementation manner, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

A second aspect of the present application provides a method for indicating a transmission frame structure, where the method is applied to a wireless local area network (WLAN), and includes: receiving, by a receiving device, a physical header of a transmission frame sent by a sending device, where the physical header of the transmission frame includes a frame structure indication field, and a subcarrier polarity of the frame structure indication field is used to indicate a frame structure of the transmission frame; and determining the frame structure of the transmission frame according to the subcarrier polarity of the frame structure indication field, where when the subcarrier polarity of the frame structure indication field is a first subcarrier polarity, the transmission frame has a first frame structure, or when the subcarrier polarity of the frame structure indication field is a second subcarrier polarity, the transmission frame has a second frame structure.

With reference to the second aspect, in a first possible implementation manner, the frame structure indication field closely follows a legacy signal field (L-SIG), and the receiving, by a receiving device, a physical header of a transmission frame sent by a sending device includes: receiving, by the receiving device, a physical header of a first transmission frame that is sent by the sending device and has the first frame structure or a physical header of a second transmission frame that is sent by the sending device and has the second frame structure, where in the physical header of the first transmission frame, there is a high efficiency wireless local area network first signal field (HE-SIG-A) after an L-SIG and before a high efficiency wireless local area network short training field (HE-STF), where the HE-SIG-A includes control indication information, the control indication information is used to instruct the receiving device how to decode all or a part of fields in a part that is of the first transmission frame and after the HE-SIG-A, and the first transmission frame is used to support a single user (SU) transmission mode, a single user multiple-input multiple-output (SU MIMO) transmission mode, and a downlink multi-user multiple-input multiple-output (DL MU MIMO) mode; in the physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose, where the second transmission frame is used to support an uplink orthogonal frequency division multiple access (UL OFDMA) transmission mode, and the common information includes at least one of the following information: a network identifier, an identifier of the receiving device, or remaining transmission duration.

With reference to the first possible implementation manner of the second aspect, in a second possible implementation manner, the first transmission frame is further used to support a downlink orthogonal frequency division multiple access (DL OFDMA) transmission mode, or the second transmission frame is further used to support a DL OFDMA transmission mode.

With reference to the first or the second possible implementation manner of the second aspect, in a third possible implementation manner, the first transmission frame is further used to support an uplink multi-user multiple-input multiple-output (UL MU MIMO) transmission mode, or the second transmission frame is further used to support a UL MU MIMO transmission mode.

With reference to any one of the first to the third possible implementation manners of the second aspect, in a fourth possible implementation manner, a high efficiency wireless local area network second signal field HE-SIG-B is further included after the HE-SIG-A of the first transmission frame and before the HE-STF of the first transmission frame, where the HE-SIG-B includes control indication information, and the control indication information included in the HE-SIG-B is used to instruct the receiving device how to decode a part that is of the first transmission frame and after the HE-SIG-B.

With reference to the fourth possible implementation manner of the second aspect, in a fifth possible implementation manner, the HE-SIG-A or the HE-SIG-B of the first transmission frame further includes mode indication information, and the method further includes: determining, according to the mode indication information, a transmission mode specifically supported by the frame structure of the first transmission frame.

With reference to the second aspect or any one of the first to the fifth possible implementation manners of the second aspect, in a sixth possible implementation manner, the receiving, by a receiving device, a physical header of a transmission frame sent by a sending device includes: receiving, by the receiving device, a physical header of a first transmission frame that is sent by the sending device and has the first frame structure or a physical header of a second transmission frame that is sent by the sending device and has the second frame structure, where after a frame structure indication field, the physical header of the first transmission frame includes a time domain repetition of a particular field; and the physical header of the second transmission frame includes the particular field, but does not include the time domain repetition of the particular field.

With reference to the sixth possible implementation manner of the second aspect, in a seventh possible implementation manner, the particular field is an RE-SIG-A.

With reference to any one of the second aspect or the first to the seventh possible implementation manners of the second aspect, in an eighth possible implementation manner, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG With reference to any one of the second aspect or the first to the eighth possible implementation manners of the second aspect, in a ninth possible implementation manner, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that phases of all the subcarriers included in the frame structure indication field are rotated by a fourth angle, where the fourth angle is greater than the third angle, and the third angle is greater than 0 degree.

A third aspect of the present application provides a sending device for indicating a transmission frame structure, where the sending device is applied to a wireless local area network (WLAN), and includes: a generation module, configured to generate a transmission frame, where a physical header of the transmission frame includes a frame structure indication field, and a subcarrier polarity of the frame structure indication field is used to indicate a frame structure of the transmission frame, where when the subcarrier polarity of the frame structure indication field is a first subcarrier polarity, the transmission frame has a first frame structure, or when the subcarrier polarity of the frame structure indication field is a second subcarrier polarity, the transmission frame has a second frame structure; and a sending module, configured to send the transmission frame, so that a receiving device determines the frame structure of the transmission frame according to the subcarrier polarity of the frame structure indication field.

With reference to the third aspect, in a first possible implementation manner, the frame structure indication field closely follows a legacy signal field L-SIG, and the generation module is specifically configured to generate a first transmission frame that has the first frame structure, or generate a second transmission frame that has the second frame structure, where in a physical header of the first transmission frame, there is a high efficiency wireless local area network first signal field HE-SIG-A after an L-SIG and before a high efficiency wireless local area network short training field HE-STF, where the HE-SIG-A includes control indication information, the control indication information is used to instruct the receiving device how to decode all or a part of fields in a part that is of the first transmission frame and after the HE-SIG-A, and the first transmission frame is used to support a single user (SU) transmission mode, a single user multiple-input multiple-output (SU MIMO) transmission mode, and a downlink multi-user multiple-input multiple-output (DL MU MIMO) transmission mode; in a physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices that include the sending device superpose, where the second transmission frame is used to support an uplink orthogonal frequency division multiple access (UL OFDMA) transmission mode, and the common information includes at least one of the following information: a network identifier, an identifier of the receiving device, or remaining transmission duration.

With reference to the first possible implementation manner of the third aspect, in a second possible implementation manner, the first transmission frame is further used to support a downlink orthogonal frequency division multiple access (DL OFDMA) transmission mode, or the second transmission frame is further used to support a DL OFDMA transmission mode.

With reference to the first or the second possible implementation manner of the third aspect, in a third possible implementation manner, the first transmission frame is further used to support an uplink multi-user multiple-input multiple-output (UL MU MIMO) transmission mode, or the second transmission frame is further used to support a UL MU MIMO transmission mode.

With reference to any one of the first to the third possible implementation manners of the third aspect, in a fourth possible implementation manner, a high efficiency wireless local area network second signal field HE-SIG-B is further included after the HE-SIG-A of the first transmission frame and before the HE-STF of the first transmission frame, where the HE-SIG-B includes control indication information, and the control indication information included in the HE-SIG-B is used to instruct the receiving device how to decode a part that is of the first transmission frame and after the HE-SIG-B.

With reference to the fourth possible implementation manner of the third aspect, in a fifth possible implementation manner, the HE-SIG-A or the HE-SIG-B of the first transmission frame further includes mode indication information, where the mode indication information is used to indicate a transmission mode specifically supported by the first transmission frame.

With reference to the third aspect or any one of the first to the fifth possible implementation manners of the third aspect, in a sixth possible implementation manner, the generation module is specifically configured to generate a first transmission frame that has the first frame structure, or generate a second transmission frame that has the second frame structure, where after a frame structure indication field, a physical header of the first transmission frame includes a time domain repetition of a particular field; and a physical header of the second transmission frame includes the particular field, but does not include the time domain repetition of the particular field.

With reference to the sixth possible implementation manner of the third aspect, in a seventh possible implementation manner, the particular field is an HE-SIG-A.

With reference to any one of the third aspect or the first to the seventh possible implementation manners of the third aspect, in an eighth possible implementation manner, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG.

With reference to any one of the third aspect or the first to the eighth possible implementation manners of the third aspect, in a ninth possible implementation manner, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

A fourth aspect of the present application provides a receiving device for indicating a transmission frame structure, where the receiving device is applied to a wireless local area network (WLAN), and includes: a receiving module, configured to receive a physical header of a transmission frame sent by a sending device, where the physical header of the transmission frame includes a frame structure indication field, and a subcarrier polarity of the frame structure indication field is used to indicate a frame structure of the transmission frame; and a determining module, configured to determine the frame structure of the transmission frame according to the subcarrier polarity of the frame structure indication field, where when the subcarrier polarity of the frame structure indication field is a first subcarrier polarity, the transmission frame has a first frame structure, or when the subcarrier polarity of the frame structure indication field is a second subcarrier polarity, the transmission frame has a second frame structure.

With reference to the fourth aspect, in a first possible implementation manner, the frame structure indication field closely follows a legacy signal field L-SIG, and the receiving module is specifically configured to receive a physical header of a first transmission frame that is sent by the sending device and has the first frame structure or a physical header of a second transmission frame that is sent by the sending device and has the second frame structure, where in the physical header of the first transmission frame, there is a high efficiency wireless local area network first signal field HE-SIG-A after an L-SIG and before a high efficiency wireless local area network short training field HE-STF, where the HE-SIG-A includes control indication information, the control indication information is used to instruct the receiving device how to decode all or a part of fields in a part that is of the first transmission frame and after the HE-SIG-A, and the first transmission frame is used to support a single user (SU) transmission mode, a single user multiple-input multiple-output (SU MIMO) transmission mode, and downlink multi-user multiple-input multiple-output (DL MU MIMO) mode; in the physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose, where the second transmission frame is used to support an uplink orthogonal frequency division multiple access (UL OFDMA) transmission mode, and the common information includes at least one of the following information: a network identifier, an identifier of the receiving device, or remaining transmission duration.

With reference to the first possible implementation manner of the fourth aspect, in a second possible implementation manner, the first transmission frame is further used to support a downlink orthogonal frequency division multiple access (DL OFDMA) transmission mode, or the second transmission frame is further used to support a DL OFDMA transmission mode.

With reference to the first or the second possible implementation manner of the fourth aspect, in a third possible implementation manner, the first transmission frame is further used to support an uplink multi-user multiple-input multiple-output (UL MU MIMO) transmission mode, or the second transmission frame is further used to support a UL MU MIMO transmission mode.

With reference to any one of the first to the third possible implementation manners of the fourth aspect, in a fourth possible implementation manner, a high efficiency wireless local area network second signal field HE-SIG-B is further included after the HE-SIG-A of the first transmission frame and before the HE-STF of the first transmission frame, where the HE-SIG-B includes control indication information, and the control indication information included in the HE-SIG-B is used to instruct the receiving device how to decode a part that is of the first transmission frame and after the HE-SIG-B.

With reference to the fourth possible implementation manner of the fourth aspect, in a fifth possible implementation manner, the HE-SIG-A or the HE-SIG-B of the first transmission frame further includes mode indication information, and the determining module is further configured to determine, according to the mode indication information, a transmission mode specifically supported by the frame structure of the first transmission frame.

With reference to the fourth aspect or any one of the first to the fifth possible implementation manners of the fourth aspect, in a sixth possible implementation manner, the receiving module is specifically configured to receive a physical header of a first transmission frame that is sent by the sending device and has the first frame structure or a physical header of a second transmission frame that is sent by the sending device and has the second frame structure, where after a frame structure indication field, the physical header of the first transmission frame includes a time domain repetition of a particular field; and the physical header of the second transmission frame includes the particular field, but does not include the time domain repetition of the particular field.

With reference to the sixth possible implementation manner of the fourth aspect, in a seventh possible implementation manner, the particular field is an RE-SIG-A.

With reference to any one of the fourth aspect or the first to the seventh possible implementation manners of the fourth aspect, in an eighth possible implementation manner, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG With reference to any one of the fourth aspect or the first to the eighth possible implementation manners of the fourth aspect, in a ninth possible implementation manner, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

A fifth aspect of the present application provides a communications system, where the communications system includes: the sending device according to the third aspect of the present application or the first to the fifth possible implementation manners of the third aspect, and the receiving device according to the fourth aspect of the present application or the first to the fifth possible implementation manners of the fourth aspect; or the communications system includes: the sending device according to the sixth or the seventh possible implementation manner of the third aspect of the present application, and the receiving device according to the sixth or the seventh possible implementation manner of the fourth aspect of the present application.

It may be seen from the foregoing that, according to the embodiments of the present application, in a technical solution, different subcarrier polarities of a frame structure indication field in a physical header of a transmission frame is used to indicate different frame structures, so as to obtain the following technical effects:

Because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

BRIEF DESCRIPTION OF DRAWINGS

FIG. 4a and FIG. 4b are schematic diagrams of two frame structures according to some embodiments of the present application;

DESCRIPTION OF EMBODIMENTS

Embodiments of the present application provide a method and device for indicating a transmission frame structure, and a system, which may be used to indicate multiple different transmission frame structures, and may be applied to a HEW into which any one or more of transmission modes in a UL OFDMA transmission mode, a DL OFDMA transmission mode, and a UL MU MIMO transmission mode are introduced.

To make a person skilled in the art understand the technical solutions in the present application better, the following clearly describes the technical solutions in the embodiments of the present application with reference to the accompanying drawings in the embodiments of the present application. Apparently, the described embodiments are merely some rather than all of the embodiments of the present application.

First, a method for indicating a transmission frame structure in the related field is briefly described.

Figure 1A:
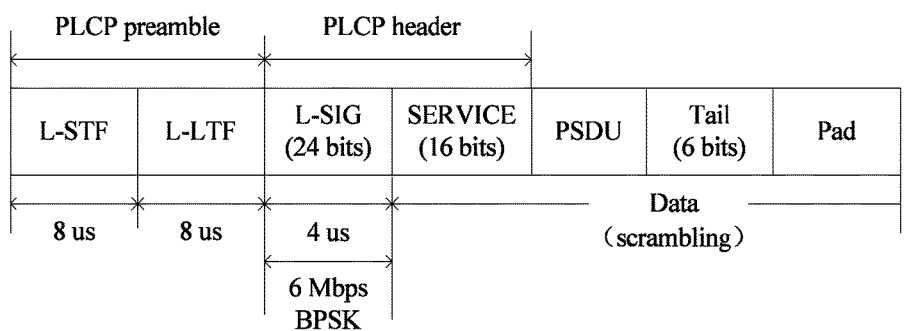
FIG. 1a to FIG. 1c are schematic diagrams of transmission frame structures in existing standards 11a/g, 11n, and 11ac, respectively.
Figure 1B:
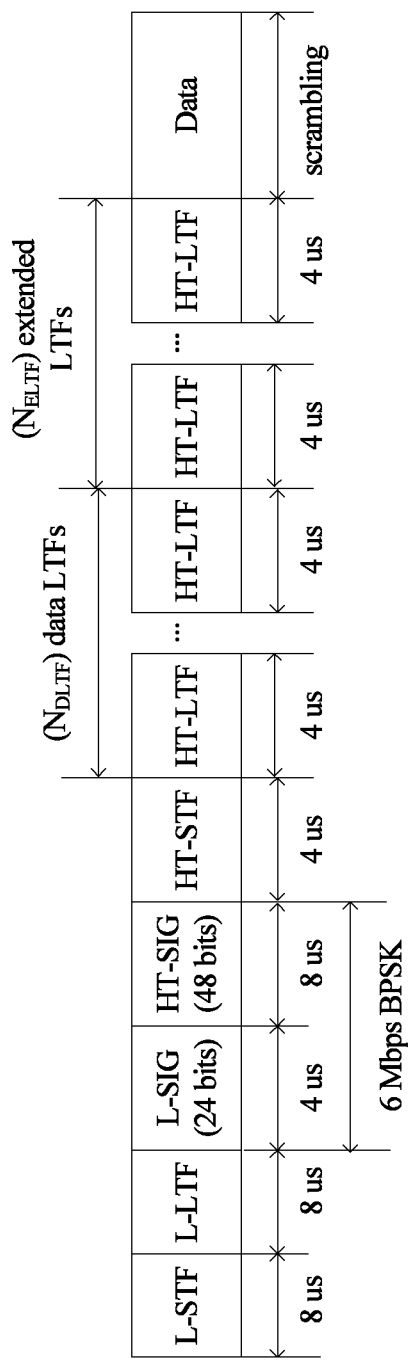
Figure 1C:
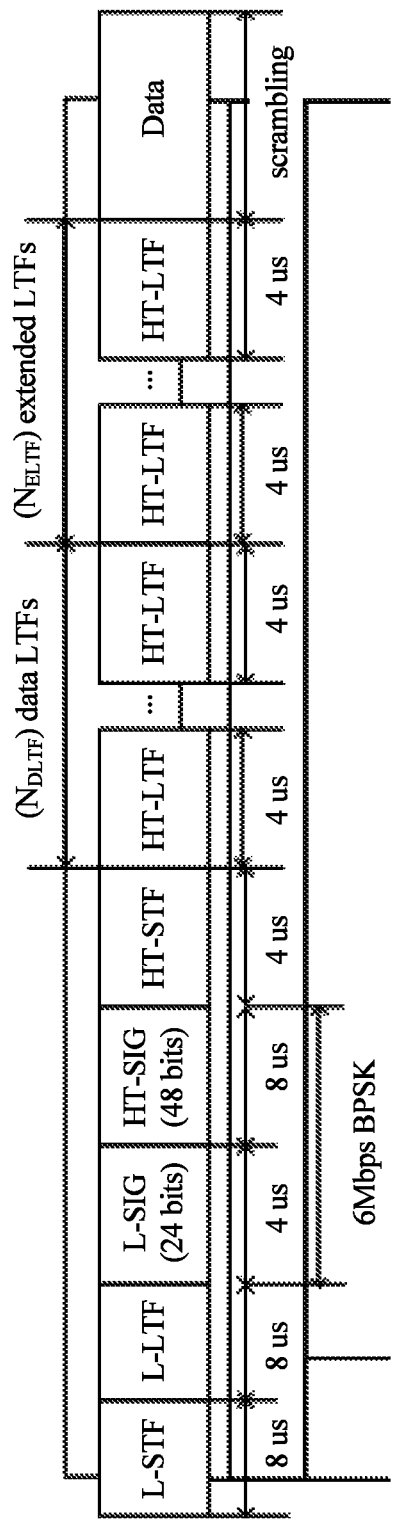

In the related field, each standard has a particular transmission frame structure. For example, transmission frame structures in existing standards 11a/g, 11n, and 11ac are respectively shown in FIG. 1a, FIG. 1b, and FIG. 1c. In 11n and 11ac frame structures, a legacy short training field (L-STF), a legacy long training field (L-LTF), and a legacy signal field (L-SIG) are collectively referred to as a legacy preamble (L-preamble), and the L-preamble is for backward compatibility. That is, when an 11a/g third-party station (STA) receives an 11n/11ac transmission frame, even though the third-party STA cannot understand subsequent transmission content, the third-party STA can still obtain transmission duration of the entire transmission frame by calculating according to content of the L-SIG, and then can choose to enter a sleep state, thereby reaching a power saving objective. Certainly, when an 11n device receives an 11ac transmission frame, the L-preamble can provide a same function.

It should be noted that, a data field (Data) in the 11n/11ac frame structure has a same structure as a data field in the 11a/g frame structure. All SIG fields in a frame structure are modulated by using binary phase shift keying (BPSK) or quadrature binary phase shift keying (QBPSK).

A length of an orthogonal frequency division multiplexing (OFDM) symbol in an existing standard is 4 μs. Therefore, an HT (high throughput)-SIG in FIG. 1b actually includes two symbols: an HT-SIG1 and an HT-SIG2. Likewise, a VHT (very high throughput)-SIG-A includes a VHT-SIG-A1 and a VHT-SIG-A2.

In the existing standard, different transmission frame structures are indicated by means of different subcarrier phase rotation of the first and the second OFDM symbols that closely follow an L-SIG In the 11a/g standard, the first and the second OFDM symbols that closely follow the L-SIG are first two symbols of the data field. In the 11n standard, the first and the second OFDM symbols that closely follow the L-SIG are the HT-SIG1 and the HT-SIG2. In the 11ac standard, the first and the second OFDM symbols that closely follow the L-SIG are the VHT-SIG-A1 and the VHT-SIG-A2.

TABLE 2

|      | First OFDM symbol        | Second OFDM symbol       |
| ---- | ------------------------ | ------------------------ |
| 11a/g | BPSK, QPSK, 16QAM, 64QAM | BPSK, QPSK, 16QAM, 64QAM |
| 11n  | QBPSK                    | BPSK                     |
| 11ac | BPSK                     | QBPSK                    |

Figure 2:
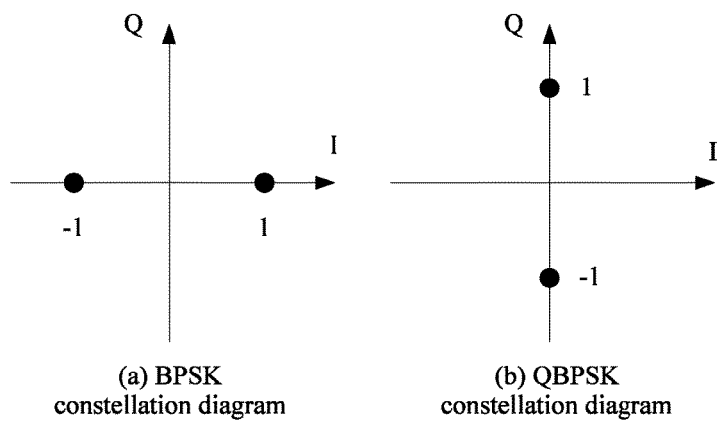
FIG. 2 is a schematic diagram of a binary phase shift keying (BPSK) constellation and a quadrature binary phase shift keying (QBPSK) constellation.

According to the existing standard, in a bandwidth of 20 MHz, the first and the second symbols after the L-SIG each include 48 data subcarriers and four pilot subcarriers. In a current 802.11 standard, subcarrier phase rotation generally means that a phase of a data subcarrier is rotated in a counterclockwise direction. In other words, a modulation constellation diagram is rotated in a counterclockwise direction. If the phase is rotated by 90 degrees, a BPSK constellation changes into a QBPSK constellation, which is shown in FIG. 2. A horizontal axis is an inphase (I) component, and a vertical axis is a quadrature (Q) component.

Referring to Table 2, when an 11n device receives a transmission frame, if QBPSK is used in the first OFDM symbol of the frame, the 11n device decodes a subsequent part according to the 11n frame structure; or if any modulation manner except QBPSK is used in the first OFDM symbol of the frame, the 11n device performs decoding according to the 11a/g frame structure (all existing standards are backward-compatible). Likewise, when an 11ac device receives a transmission frame, if QBPSK is used in the first symbol of the frame, the 11ac device decodes a subsequent part according to the 11n frame structure; or if BPSK is used in the first symbol, and QBPSK is used in the second symbol, the 11ac device decodes a subsequent part according to the 11ac frame structure; or in any case except the foregoing two cases, the 11ac device performs decoding according to the 11a/g frame structure. Optionally, the device may directly discard a frame structure that cannot be identified by the device.

It may be seen from the foregoing that, in a successive standard of 802.11n, the first and the second symbols for indicating a frame structure, for example, an HT-SIG1 and an HT-SIG2, or a VHT-SIG-A1 and a VHT-SIG-A2, both include control information used to decode a data field, for example, a modulation and coding scheme (MCS). A receive end may determine, according to the control information, how to decode a subsequent part of a frame. Control information in 802.11a/g is in an L-SIG. An 802.11n or 802.11ac device performs detection on two symbols after an L-SIG in a received transmission frame, that is, first two symbols of a data field, to identify whether the transmission frame is a legacy transmission frame. Therefore, the foregoing solution is applicable to only a scenario in which one device performs sending, and one or more devices perform receiving. If multiple devices perform sending, and one device performs receiving, content of the first symbols and the second symbols of transmission frames sent by the multiple devices randomly superpose, and therefore, the receiving device cannot correctly receive and parse the transmission frames. Therefore, the existing foregoing solution is not applicable to a case in which multiple devices perform sending, and one device performs receiving, that is, not applicable to UL MU transmission modes that are to be introduced into a HEW, such as UL OFDMA, UL MU MIMO, etc.

In addition, in the related field, a particular frame structure is used in each standard, and a physical header of the frame structure can indicate only this frame structure. However, with development of a WLAN, more transmission modes need to be supported, and multiple frame structures may be designed in one standard. As a result, the solution cannot satisfy all applications. For example, the 11ax standard needs to support more than five transmission modes. It is difficult for one frame structure to satisfy this requirement, that is, at least two frame structures may need to be designed to separately support different transmission modes. However, in the related field, a physical header of a transmission frame can indicate only one frame structure, which cannot satisfy a requirement for indicating multiple frame structures.

In conclusion, an existing frame structure indication technology is not applicable to a HEW into which any one or more of a UL OFDMA transmission mode, a DL OFDMA transmission mode, a UL MU MIMO transmission mode, and the like are introduced.

For the foregoing problem, embodiments of the present application provide a method and a corresponding device for indicating a transmission frame structure, and a system that are applicable to a HEW. The following provides detailed descriptions separately by using specific embodiments.

Embodiment 1

Figure 3:
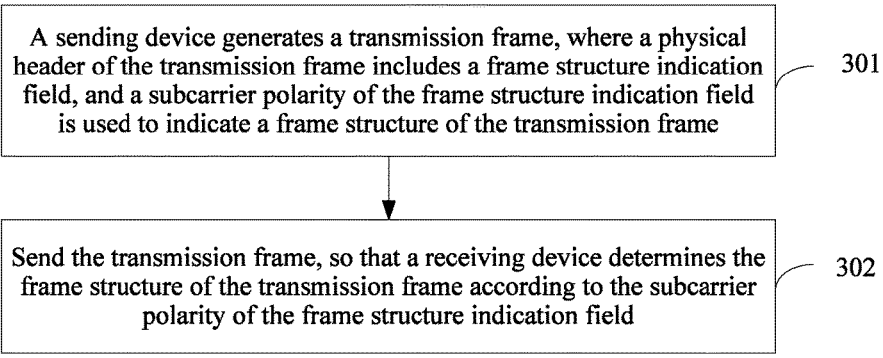
FIG. 3 is a flow diagram of a method for indicating a transmission frame structure according to an embodiment of the present application.

Referring to FIG. 3, this embodiment of the present application provides a method for indicating a transmission frame structure. The method is applied to a WLAN, and is particularly applied to a HEW. The method may include the following steps:

301. A sending device generates a transmission frame.

In this embodiment of the present application, the sending device generates the transmission frame, where a physical header of the transmission frame includes a frame structure indication field, and a subcarrier polarity of the frame structure indication field is used to indicate a frame structure of the transmission frame.

Optionally, the frame structure indication field may include at least one OFDM symbol, and may closely follow an L-SIG in the physical header.

In this specification, various frames and various fields in a frame, such as a transmission frame or a frame structure indication field in a transmission frame, is merely under exemplary names, and may also be given other names, provided that a frame or field under other names has a same or similar function.

302. Send the transmission frame, so that a receiving device determines a frame structure of the transmission frame according to the subcarrier polarity of the frame structure indication field.

In this embodiment of the present application, the transmission frame is sent to the receiving device. Therefore, after receiving the physical header of the transmission frame, the receiving device may determine the frame structure of the transmission frame according to the subcarrier polarity of the frame structure indication field in the physical header, and then determine how to process a remaining part after the frame structure indication field of the transmission frame, for example, determine whether to receive the remaining part.

As described in the foregoing, for an OFDM-based 802.11 standard, a subcarrier in an OFDM symbol includes a data subcarrier and a pilot subcarrier, and a subcarrier herein generally refers to a data subcarrier. Unless otherwise stated, all subcarriers involved in descriptions of this specification refer to data subcarriers.

In this embodiment of the present application, the sending device may generate transmission frames with at least two frame structures. When the subcarrier polarity of the frame structure indication field is a first subcarrier polarity, the transmission frame has a first frame structure. When the subcarrier polarity of the frame structure indication field is a second subcarrier polarity, the transmission frame has a second frame structure.

Optionally, a frame structure indication field in the second frame structure may include only common information, but not include control information used to decode a data field, so that decoding can be performed after signals superpose. Therefore, a scenario in which multiple devices perform sending, and a single device performs receiving is supported. The common information may help a third-party HEW device understand the transmission frame, but is meaningless to a target receiving device. That is, the control information used to decode a data field of the transmission frame is not included. The common information includes at least one of the following information: a network identifier, an identifier of the receiving device, or remaining transmission duration.

It may be seen from the foregoing that, according to this embodiment of the present application, in a technical solution, a subcarrier polarity of a frame structure indication field in a physical header of a transmission frame is used to indicate different transmission frame structures, so as to obtain the following technical effects:

1. Because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

2. A legacy device may determine, according to a subcarrier polarity of a frame structure indication field in a physical header of a transmission frame, that the transmission frame is a transmission frame that cannot be parsed by the legacy device. A HEW device may determine a structure of the transmission frame according to the subcarrier polarity of the frame structure indication field in the physical header of the transmission frame, and then determine how to receive and parse a remaining part of the transmission frame.

The following further describes in detail the method in this embodiment of the present application.

First

In some embodiments of the present application, a transmission frame structure applied to a HEW is provided.

Figure 4B:
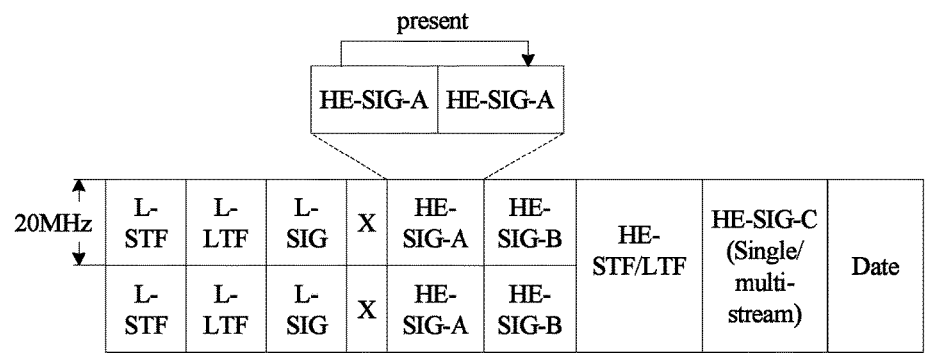

To support both an existing transmission mode (that is, transmission modes such as SU, SU MIMO, and DL MU MIMO that are supported by standards such as 11a/g, 11n, and 11ac) and a newly-added transmission mode (that is, transmission modes such as UL MU MIMO and UL/DL OFDMA that may be introduced into the 11ax standard), two transmission frame structures applied to the HEW are proposed, and are respectively shown in FIG. 4a and FIG. 4b.

FIG. 4a is a schematic diagram of a first frame structure. In this specification, a transmission frame that has the first frame structure is referred to as a first transmission frame. The first transmission frame is used to support the SU transmission mode, the SU MIMO transmission mode, and the DL MU MIMO transmission mode, and may be further used to support the DL OFDMA transmission mode.

An L-preamble part in a physical header of the first transmission frame includes fields such as an L-STF, an L-LTF, and an L-SIG. The L-preamble part is the same as L-preamble parts in existing standards such as 11n and 11ac, and details are not described herein. An HE (high efficiency wireless local area network)-STF and an HE-LTF field are further included between the L-preamble part of the first transmission frame and a Data part of the first transmission frame. The HE-STF and the HE-LTF provide same functions as an HT-STF and an HT-LTF in the 11n standard, or a VHT-STF and a VHT-LTF in the 11ac standard, and details are not described herein.

Specially, in the physical header of the first transmission frame, there is an HE-SIG-A after the L-SIG and before the HE-STF. The HE-SIG-A includes control indication information. The control indication information is used to instruct a receiving device how to decode all or a part of fields in a part that is of the first transmission frame and after the HE-SIG-A. The control indication information includes, for example, bandwidth of the data field, and an MCS.

It should be noted that, according to step 301, a frame structure indication field closely follows an L-SIG in a physical header. Therefore, that in the physical header of the foregoing first transmission frame, there is an HE-SIG-A after the L-SIG and before the HE-STF includes two specific cases: The HE-SIG-A is after a frame structure indication field and before the HE-STF; or all or a part of symbols of the HE-SIG-A are a frame structure indication field.

Optionally, an HE-SIG-B is further included after the HE-SIG-A of the first transmission frame and before the HE-STF of the first transmission frame. The HE-SIG-B includes control indication information. The control indication information in the HE-SIG-B is used to instruct the receiving device how to decode a part that is of the first transmission frame and after the HE-SIG-B. The HE-SIG-B described herein is a newly-added field in this embodiment, and is different from an HT-SIG2 in an original standard such as 11ac.

The HE-SIG-B and the HE-SIG-A are coded/decoded independently. The HE-SIG-A indicates information about the HE-SIG-B, such as an MCS and a length. That is, a higher order MCS may be used for the HE-SIG-B, and the HE-SIG-B is changeable in length, which enables the HE-SIG-B to carry more bits. Because the HE-SIG-B can carry more bits, for example, control information used to decode the data field, an HE-SIG-C may not exist.

Optionally, the control indication information in the HE-SIG-A is used to decode the HE-SIG-B, and the control indication information in the HE-SIG-B is used to decode the data field.

Optionally, the HE-SIG-A or the HE-SIG-B of the first transmission frame further includes mode indication information. The mode indication information is used to indicate a transmission mode specifically supported by the first transmission frame, for example, indicate a specifically supported transmission mode in SU, SU MIMO, DL MU MIMO, and DL OFDMA.

Optionally, an HE-SIG-C may be further included or an HE-SIG-C may be not included after the HE-LTF of the first transmission frame and before the data field of the first transmission frame. The HE-SIG-C described herein is similar to an HT-SIG2 in an original standard such as 11ac. The HE-SIG-C is used in a DL MU MIMO or DL OFDMA scenario, and carries control indication information for a particular receiving device. Actually, the control information may also be carried by the HE-SIG-A or the HE-SIG-B. However, the HE-SIG-A can be transmitted by using only 20 MHz. Instead, the HE-SIG-C after the HE-STF and the HE-LTF may be transmitted in parallel by using larger bandwidth or multiple spatial flows, which has higher transmission efficiency and can effectively reduce transmission overheads.

In comparison with a frame structure in an existing standard, the 11ax standard is applicable to an outdoor scenario in which a multipath effect is relatively severe. Therefore, a long symbol (that is, an OFDM symbol with a longer guard interval (GI)) is preferable to be used in the data field of the first transmission frame, so as to offset a relatively large delay extension. A length of the GI may be indicated in the HE-SIG-A.

FIG. 4b is a schematic diagram of a second frame structure. In this specification, a transmission frame that has the second frame structure is referred to as a second transmission frame. The second transmission frame is used to support the UL MU MIMO transmission mode, and may be further used to support the UL OFDMA transmission mode, or may be further used to support the DL OFDMA transmission mode. The second transmission frame can closely follow only a trigger frame sent by a device, for example, an access point (AP).

An L-preamble part in a physical header of the second transmission frame includes fields such as an L-STF, an L-LTF, and an L-SIG. The L-preamble part is the same as L-preamble parts in existing standards such as 11n and 11ac, and details are not described herein. An HE (high efficiency wireless local area network)-STF and an HE-LTF field are further included between the L-preamble part of the second transmission frame and a Data part of the second transmission frame. The HE-STF and the HE-LTF are similar to HT-STFs and HT-LTFs in the standards such as 11n and 11ac, and details are not described herein.

Optionally, an HE-SIG-C may be included or an HE-SIG-C may be not included after the HE-LTF of the second transmission frame and before the Data of the second transmission frame. The HE-SIG-C is used to carry control indication information. The control indication information is used to instruct a receiving device how to decode the data field that is of the second transmission frame and after the HE-SIG-C. However, because the second transmission frame is always sent just after the AP sends a trigger frame, the control indication information may be specified in the trigger frame by the AP. In this case, the second transmission frame does not need to carry the control indication information. That is, the second transmission frame does not need to include the HE-SIG-C.

Specially, in the physical header of the second transmission frame, there may be no HE-SIG-A after the L-SIG and before the HE-STF, or there is an HE-SIG-A, but the HE-SIG-A includes only common information, and does not carry control information used to decode the data field, so that decoding can still be performed after HE-SIG-As in second transmission frames sent by multiple sending devices that include the sending device superpose. The common information includes at least one of the following information: a network identifier, an identifier of the receiving device (such as an AP), or remaining transmission duration. The network identifier is a color or the like. An AP identifier is a basic service set identifier (BSSID) or the like.

It should be noted that, according to step 301, a frame structure indication field closely follows an L-SIG in a physical header. Therefore, that in the physical header of the foregoing first transmission frame, there is an HE-SIG-A after the L-SIG and before the HE-STF includes two specific cases: The HE-SIG-A is after a frame structure indication field and before the HE-STF; or all or a part of symbols of the HE-SIG-A are a frame structure indication field.

Optionally, if the second transmission frame includes the HE-SIG-A, the HE-SIG-A can carry only common information such as an AP identifier and Duration, but cannot carry any control information that may be used to decode the data field, such as bandwidth of the data field and an MCS. In this case, the common information in the HE-SIG-A may help a third-party HEW device understand the transmission frame. For example, the third-party device may set a network allocation vector (NAV) according to the Duration. However, the common information is meaningless to a target receiving device. That is, the control information used to decode a data field of the transmission frame is not included. Preferably, the second transmission frame does not include the HE-SIG-A, which is a simplest design that is shown in FIG. 4b.

Figure 5A:
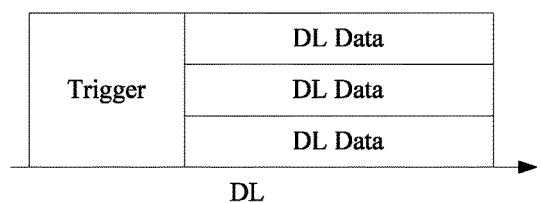
FIG. 5a and FIG. 5b are schematic diagrams of two implementation manners of DL OFDMA.
Figure 5B:
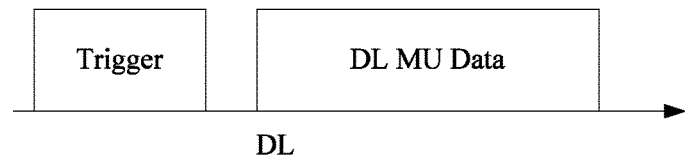

It should be specially noted that whether the first transmission frame or the second transmission frame is used in DL OFDMA depends on an implementation manner of the DL OFDMA. For the DL OFDMA, there are two possible implementation manners. One manner is shown in FIG. 5a. An AP concatenates a trigger frame and DL OFDMA Data together for sending. In this case, resource scheduling information is in a physical header of a concatenation transmission frame, and the trigger frame is actually the physical header of the entire concatenation transmission frame. The other manner is shown in FIG. 5b. An AP first sends a trigger frame, and then sends DL OFDMA Data after an interval of a predetermined time length, where the trigger frame includes the resource scheduling information. In this case, the resource scheduling information is in a physical header of the trigger frame or media access control (MAC) layer data. If the implementation manner of the DL OFDMA shown in FIG. 5a is used, the first transmission frame shown in FIG. 4a is used. If the implementation manner of the DL OFDMA shown in FIG. 5b is used, the second transmission frame shown in FIG. 4b is used.

If the UL MU MIMO transmission mode is introduced into the HEW, either the first transmission frame or the second transmission frame may be selected, according to an actual requirement, to be used in the UL MU MIMO.

Second

Some embodiments of the present application provide multiple expression manners of a subcarrier polarity.

In some embodiments of the present application, a transmission frame generated by a sending device may be a first transmission frame that has a first frame structure, or may be a second transmission frame that has a second frame structure. Subcarrier polarities of frame structure indication fields in physical headers of the first transmission frame and the second transmission frame are different, so as to indicate different frame structures. The frame structure indication field in the first transmission frame has a first subcarrier polarity, and the frame structure indication field in the second transmission frame has a second subcarrier polarity.

A subcarrier polarity of a frame structure indication field may have the following multiple expression manners, but is not limited to the following manners:

A. In some implementation manners of the present application, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle.

The second angle is greater than the first angle, and the first angle is greater than or equal to 0 degree.

The multiple subcarriers included in the frame structure indication field may be divided into two groups in any manner. Preferably, the first group of subcarriers may be odd-numbered subcarriers, and the second group of subcarriers may be an even-numbered subcarrier; or the first group of subcarriers may be even-numbered subcarriers, and the second group of subcarriers may be an odd-numbered subcarrier.

Phase rotation may be phase rotation relative to an L-SIG. The rotated first angle and second angle may be any value, for example, may be respectively 0 degree and 90 degrees. That is, the first subcarrier polarity is that the phases of the first group of subcarriers are rotated by 90 degrees, and the phases of the second group of subcarriers are not rotated; the second subcarrier polarity is that the phases of the first group of subcarriers are not rotated, and the phases of the second group of subcarriers are rotated by 90 degrees.

B. In some other implementation manners of the present application, the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled.

The filling means filling information into a subcarrier, and the vacancy means not filling any information into a subcarrier. A vacant subcarrier does not carry information about the sending device.

The multiple subcarriers included in the frame structure indication field may be divided into two groups in any manner. Preferably, the first group of subcarriers may be odd-numbered subcarriers, and the second group of subcarriers may be an even-numbered subcarrier; or the first group of subcarriers may be even-numbered subcarriers, and the second group of subcarriers may be an odd-numbered subcarrier.

C. In still some implementation manners of the present application, the first subcarrier polarity means that phases of all subcarriers included in the frame structure indication field are rotated by a third angle; and the second subcarrier polarity means that the phases of all the subcarriers included in the frame structure indication field are rotated by a fourth angle.

The fourth angle is greater than the third angle, and the third angle is greater than 0 degree.

Phase rotation may be phase rotation relative to an L-SIG. For example, the third angle is 45 degrees, and the fourth angle is 135 degrees. That is, the first subcarrier polarity is that the phases of all the subcarriers included in the frame structure indication field are rotated by 45 degrees, and the second subcarrier polarity is that the phases of all the subcarriers included in the frame structure indication field are rotated by 135 degrees. It should be specially noted that, in an existing standard, phase rotation generally refers to rotation in a counterclockwise direction.

The multiple subcarriers included in the frame structure indication field may be divided into two groups in any manner. Preferably, a first group of subcarriers may be odd-numbered subcarriers, and the second group of subcarriers may be an even-numbered subcarrier; or a first group of subcarriers may be an even-numbered subcarrier, and the second group of subcarriers may be an odd-numbered subcarrier.

It should be noted that, because repetition transmission is performed on all parts before an HE-STF on a basis of 20 MHz, the foregoing descriptions are for a bandwidth of 20 MHz. In 20 MHz, all the parts before the HE-STF each include 52 effective subcarriers that are numbered ±1, ±2, . . . , ±26. Subcarriers numbered ±7 and ±21 are pilot subcarriers, and the other 48 subcarriers are data subcarriers. In the foregoing description, the subcarriers on which a phase rotation operation is performed preferably refer to the 48 data subcarriers. That is, preferably, the subcarriers described in the foregoing specifically refer to data subcarriers.

Third

Some embodiments of the present application provide multiple expression manners of a frame structure indication field.

The following further describes the frame structure indication field.

Referring to FIG. 4a and FIG. 4b, the frame structure indication field is indicated by X in the figures, and X may have the following several possible kinds of content.

In some implementation manners, a frame structure indication field in a first frame structure and that in a second frame structure both are RL-SIGs. The RL-SIG is a time domain repetition of an L-SIG. The time domain repetition is repetition in terms of time, and may be understood as addition of a field after a particular field, for example, an L-SIG. Content of the added field is the same as that of the particular field, for example, the L-SIG. However, the added field and the particular field may be different in physical waveform. For example, the added field is a result obtained after phase rotation is performed on the particular field.

In this case, in the first frame structure, the RL-SIG is inevitably followed by an HE-SIG-A. This design is a preferred solution. Optionally, a HEW device may have a higher probability of correctly obtaining, by means of parsing by using the RL-SIG with reference to the foregoing L-SIG, content included in the L-SIG. According to a standard, the L-SIG includes only the following information: a RATE that is generally set to 6 Mps, a LENGTH that is in units of bytes and indicates a time domain length of a current frame with reference to the rate, a parity bit used to check a rate and a length, and a tail bit used to decode convolutional code. The L-SIG aims to be compatible with a legacy device, but cannot provide, for a receiving device, information required for decoding a data field. In the second frame structure, because the second frame structure is mainly used for UL MU transmission, transmission frames sent by multiple devices need to be equal in length (even if original data is not equal in length, an equal length needs to be implemented in a filling manner and the like) in terms of a time domain, that is, LENGTHs of all users are the same. Therefore, L-SIGs sent by all devices are the same, so that decoding can still be correctly performed after L-SIGs sent by different devices superpose. In a word, the L-SIG actually does not include any information that is helpful for a receive end to perform decoding.

Alternatively, in some implementation manners, a frame structure indication field in a first frame structure is all or a part of OFDM symbols of an HE-SIG-A, and a frame structure indication field in a second frame structure is an RL-SIG. The RL-SIG is a time domain repetition of an L-SIG. In this case, the first transmission frame does not include an RL-SIG, and overheads may be much lower. The HE-SIG-A may include multiple OFDM symbols, and X may be a part of the symbols (for example, only the first symbol) of the multiple OFDM symbols, or may include all symbols of the multiple OFDM symbols. The L-SIG does not include any information that is helpful for a receive end to perform decoding.

Alternatively, in some implementation manners, a frame structure indication field in the first frame structure is all or a part of OFDM symbols of an HE-SIG-A, and a frame structure indication field in the second frame structure is all or a part of OFDM symbols of an HE-SIG-A. In this case, an HE-SIG-A in the first transmission frame may carry control indication information that is helpful for a receive end to perform decoding, and an HE-SIG-A in the second transmission frame can carry only common information. The common information may include at least one of the following information: a network identifier, an identifier of a receiving device (such as an AP), or remaining transmission duration.

Alternatively, in some implementation manners, a frame structure indication field in the first frame structure is an RL-SIG, a frame structure indication field in the second frame structure is all or a part of OFDM symbols of an HE-SIG-A, where the RL-SIG is a time domain repetition of an L-SIG. In this case, in the first transmission frame, an RL-SIG is inevitably followed by an HE-SIG-A. An HE-SIG-A in the second transmission frame can carry only common information. The common information may include at least one of the following information: a network identifier, an identifier of a receiving device (such as an AP), or remaining transmission duration.

Fourth

Some embodiments of the present application provide a method for enhancing and indicating a particular field in a frame structure.

In some embodiments of the present application, that the sending device generates the transmission frame in 301 may include: The sending device generates a first transmission frame that has a first frame structure, or generates a second transmission frame that has a second frame structure.

In the first frame structure in this embodiment of the present application, there is an HE-SIG-A after an L-SIG and before an HE-STF. The HE-SIG-A includes control indication information, such as bandwidth and an MCS. A receiving device may determine, according to the information, how to decode all or a part of fields in a part after the HE-SIG-A. Apparently, reliability of the HE-SIG-A is very important. Once the HE-SIG-A is incorrectly received, a data field cannot be decoded. Therefore, in some cases, the reliability of the HE-SIG-A needs to be enhanced. However, enhancement of the HE-SIG-A is not always needed. For example, when a channel is in a good condition and with small interference surrounded, it is unnecessary to perform enhancement on the HE-SIG-A. It may be understood that, in addition to the HE-SIG-A, there may be another particular field that needs enhancement.

Figure 4C:
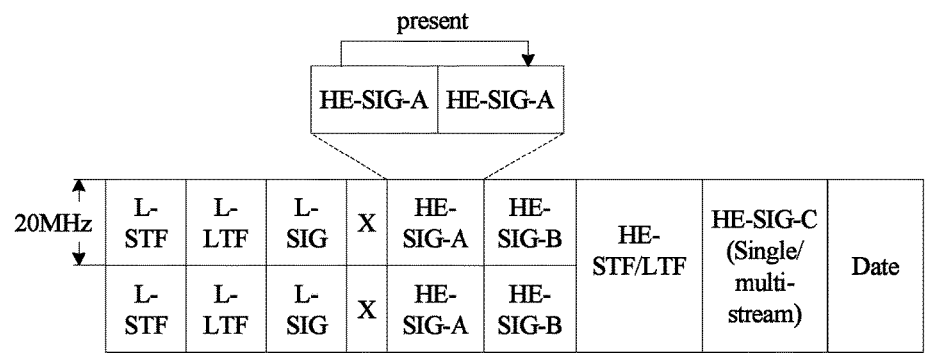
FIG. 4c is a schematic structural diagram of a first transmission frame according to some other embodiments of the present application.

Therefore, in this embodiment of the present application, a time domain repetition of a particular field may be included after a frame structure indication field in the first transmission frame, so as to implement enhancement of the particular field. The particular field may be an HE-SIG-A or another field. An HE-SIG-A is used as example herein. A time domain repetition of the HE-SIG-A may be included after the HE-SIG-A in the first transmission frame. In addition, a subcarrier polarity of the HE-SIG-A may be used to indicate whether the time domain repetition of the HE-SIG-A is further included after the HE-SIG-A. For example, as shown in FIG. 4c, the time domain repetition of the HE-SIG-A is further included after the HE-SIG-A in the first transmission frame. In FIG. 4c, X is an RL-SIG, and after the RL-SIG, there is the HE-SIG-A and the time domain repetition of the HE-SIG-A. It should be noted that a physical header of the second transmission frame includes the particular field, for example, the HE-SIG-A, but does not include the time domain repetition of the particular field.

In an implementation manner, a subcarrier polarity of the HE-SIG-A in the first transmission frame may be used to indicate that the time domain repetition of the HE-SIG-A is further included after the HE-SIG-A. For an expression form of the subcarrier polarity of the HE-SIG-A, reference may be made to any one of the foregoing manners A, B, and C, and simplest implementation is: When a phase of a subcarrier of the HE-SIG-A is not rotated, there is no repetition of the HE-SIG-A after the HE-SIG-A, or when phases of all subcarriers of the HE-SIG-A are rotated by 90 degrees, there is a repetition of the HE-SIG-A after the HE-SIG-A. In this case, the HE-SIG-A is the frame structure indication field.

In another implementation manner, a subcarrier polarity of the frame structure indication field X may be used to indicate whether there is the time domain repetition of the HE-SIG-A. In this case, X should have three polarities:

Polarity 1: indicates that a transmission frame (that is, the first transmission frame) has the first frame structure, and there is no time domain repetition of the HE-SIG-A.

Polarity 2: indicates that a transmission frame (that is, the first transmission frame) has the first frame structure, and there is the time domain repetition of the HE-SIG-A.

Polarity 3: indicates that a transmission frame (that is, the second transmission frame) has the second frame structure.

How does X express the three polarities? The polarity of X may be extended by using a method for grouping subcarriers. For example, multiple subcarriers included in X are divided into three groups (for example, subcarrier numbers are separately 3n, 3n+1, and 3n+2), and filling/phase rotation is performed on different groups, so as to present different polarities.

A subcarrier polarity of the foregoing OFDM symbol is used to dynamically indicate whether there is a repetition of an HE-SIG-A. If necessary, transmission reliability of the HE-SIG-A may be enhanced. However, in a scenario in which it is unnecessary to enhance reliability, the HE-SIG-A is not repeated, which helps reduce transmission overheads.

In the second frame structure in this embodiment of the present application, the HE-SIG-A includes only common information, and does not carry control indication information, so that the HE-SIG-A does not need enhancement. Therefore, the second transmission frame that has the second frame structure may include the particular field, but does not include the time domain repetition of the particular field.

It should be noted that, the foregoing first, second, third, and fourth parts are separately further refinement or supplement to the method shown in FIG. 3 of the present application, and the four parts are independent of each other in terms of content, and certainly may be combined with each other in terms of content.

It may be understood that, the foregoing solution in this embodiment of the present application may be specifically implemented by a device, for example, a STA or an AP.

It may be seen from the foregoing that, this embodiment of the present application discloses a method for indicating a transmission frame structure. According to the method, in a technical solution, a subcarrier polarity of a frame structure indication field in a physical header of a transmission frame is used to indicate different frame structures, so as to obtain the following technical effects:

First, because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

Second, in some implementation manners, a frame structure indication field in a second frame structure includes only common information. In a scenario in which multiple devices perform sending, and one device performs receiving, frame structure indication fields in transmission frames sent by the multiple devices are the same, and may still be properly received and parsed after the frame structure indication fields superpose. Therefore, the second frame structure supports a scenario in which multiple devices perform sending, and one device performs receiving, and may be applied to a HEW into which any one or more of transmission modes in transmission modes of UL OFDMA, DL OFDMA, and UL MU MIMO are introduced.

Third, in some implementation manners, whether to perform time domain repetition on a particular field, for example, an HE-SIG-A, may be indicated by using a subcarrier polarity of a frame structure indication field. In some scenarios, the particular field is repeated to enhance reliability of the particular field, and in some other scenarios, the particular field is not repeated to reduce overheads.

Fourth, in some implementation manners, an expression manner of a subcarrier polarity is that a group of subcarriers are filled/phases of a group of subcarriers are rotated, and another group of subcarriers are vacant/phases of another group of subcarriers are not rotated. Because the expression manner has a higher identification degree, in comparison with an indication method in the related field, in this embodiment of the present application, a receiving device can more easily identify a structure of a transmission frame.

Embodiment 2

Figure 6:
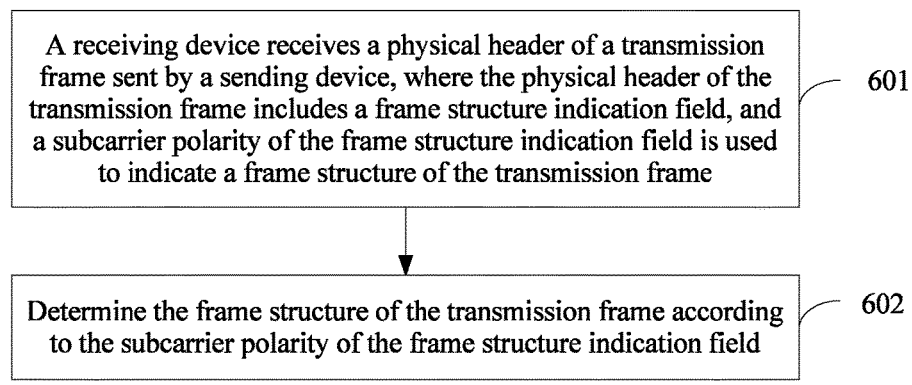
FIG. 6 is a flow diagram of another method for indicating a transmission frame structure according to an embodiment of the present application.

Referring to FIG. 6, this embodiment of the present application further provides a method for indicating a transmission frame structure. The method is applied to a WLAN, and may include:

601. A receiving device receives a physical header of a transmission frame sent by a sending device, where the physical header of the transmission frame includes a frame structure indication field, and a subcarrier polarity of the frame structure indication field is used to indicate a frame structure of the transmission frame.

602. Determine the frame structure of the transmission frame according to the subcarrier polarity of the frame structure indication field.

When the subcarrier polarity of the frame structure indication field is a first subcarrier polarity, the transmission frame has a first frame structure. When the subcarrier polarity of the frame structure indication field is a second subcarrier polarity, the transmission frame has a second frame structure.

In some embodiments of the present application, the frame structure indication field closely follows a legacy signal field L-SIG. That the receiving device receives the physical header of the transmission frame sent by the sending device may include: The receiving device receives a physical header of a first transmission frame that is sent by the sending device and has the first frame structure or a physical header of a second transmission frame that is sent by the sending device and has the second frame structure.

In the physical header of the first transmission frame, there is a high efficiency wireless local area network first signal field HE-SIG-A after an L-SIG and before a high efficiency wireless local area network short training field HE-STF. The HE-SIG-A includes control indication information, and the control indication information is used to instruct the receiving device how to decode all or a part of fields in a part that is of the first transmission frame and after the HE-SIG-A. The first transmission frame is used to support a single user (SU) transmission mode, a single user multiple-input multiple-output (SU MIMO) transmission mode, and a downlink multi-user multiple-input multiple-output (DL MU MIMO) transmission mode.

In the physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose. The second transmission frame is used to support an uplink orthogonal frequency division multiple access UL OFDMA transmission mode.

The common information includes at least one of the following information: a network identifier, an identifier of the receiving device, or remaining transmission duration.

In some embodiments of the present application, the first transmission frame is further used to support a downlink orthogonal frequency division multiple access DL OFDMA transmission mode, or the second transmission frame is further used to support a DL OFDMA transmission mode.

In some embodiments of the present application, the first transmission frame is further used to support an uplink multi-user multiple-input multiple-output UL MU MIMO transmission mode, or the second transmission frame is further used to support a UL MU MIMO transmission mode.

After determining the frame structure of the transmission frame according to the subcarrier polarity of the frame structure indication field, the receiving device may process a remaining part of the transmission frame by using a corresponding method. For example, when a HEW STA that does not receive a trigger frame sent in advance by an AP or an AP that does not send a trigger frame before a predetermined time length detects a second transmission frame, the HEW STA or the AP directly discards the frame because the second transmission frame is certainly not sent to the HEW STA or the AP. The STA or the AP may enter a sleep state during a transmission time (obtained by calculating according to the L-SIG) of the transmission frame, so as to reach a power saving objective.

In some embodiments of the present application, a high efficiency wireless local area network second signal field HE-SIG-B is further included after the HE-SIG-A of the first transmission frame and before the HE-STF of the first transmission frame. The HE-SIG-B includes control indication information, and the control indication information included in the HE-SIG-B is used to instruct the receiving device how to decode a part that is of the first transmission frame and after the HE-SIG-B.

In some embodiments of the present application, the HE-SIG-A or the HE-SIG-B of the first transmission frame further includes mode indication information. The method further includes: determining, according to the mode indication information, a transmission mode specifically supported by the frame structure of the first transmission frame.

In some embodiments of the present application, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

In some embodiments of the present application, that the receiving device receives the physical header of the transmission frame sent by the sending device includes: The receiving device receives a physical header of a first transmission frame that is sent by the sending device and has the first frame structure or a physical header of a second transmission frame that is sent by the sending device and has the second frame structure. After a frame structure indication field, the physical header of the first transmission frame includes a time domain repetition of a particular field. The physical header of the second transmission frame includes the particular field, but does not include the time domain repetition of the particular field.

In some embodiments of the present application, the particular field is an RE-SIG-A.

In some embodiments of the present application, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG In the foregoing embodiment shown in FIG. 6, that the receiving device is an execution body is used as an example to describe the method in this embodiment of the present application. For detailed descriptions, reference may be made to Embodiment 1 shown in FIG. 3 to FIG. 5. All content described in Embodiment 1 may be correspondingly referenced to Embodiment 2, and details are not described herein.

It may be understood that, the foregoing solution in this embodiment of the present application may be specifically implemented by a device, for example, a STA or an AP.

It may be seen from the foregoing that, this embodiment of the present application discloses a method for indicating a transmission frame structure. According to the method, in a technical solution, a subcarrier polarity of a frame structure indication field in a physical header of a transmission frame is used to indicate different frame structures, so as to obtain the following technical effects:

First, because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

Second, in some implementation manners, a frame structure indication field includes only common information. In a scenario in which multiple devices perform sending, and one device performs receiving, frame structure indication fields in transmission frames sent by the multiple devices are the same, and may still be properly received and parsed after the frame structure indication fields superpose. Therefore, the frame structure supports a scenario in which multiple devices perform sending, and one device performs receiving, and may be applied to a HEW into which any one or more of transmission modes in transmission modes of UL OFDMA, DL OFDMA, and UL MU MIMO are introduced.

Third, in some implementation manners, whether to perform time domain repetition on a particular field, for example, an HE-SIG-A, may be indicated by using a subcarrier polarity of a frame structure indication field. In some scenarios, the particular field is repeated to enhance reliability of the particular field, and in some other scenarios, the particular field is not repeated to reduce overheads.

Fourth, in some implementation manners, an expression manner of a subcarrier polarity is that a group of subcarriers are filled/phases of a group of subcarriers are rotated, and another group of subcarriers are vacant/phases of another group of subcarriers are not rotated. Because the expression manner has a higher identification degree, in comparison with an indication method in the related field, in this embodiment of the present application, a receiving device can more easily identify a structure of a transmission frame.

To better implement the foregoing solutions in the embodiments of the present application, the following further provides a related apparatus that is configured to implement the foregoing solutions in a cooperation manner.

Embodiment 3

Figure 7:
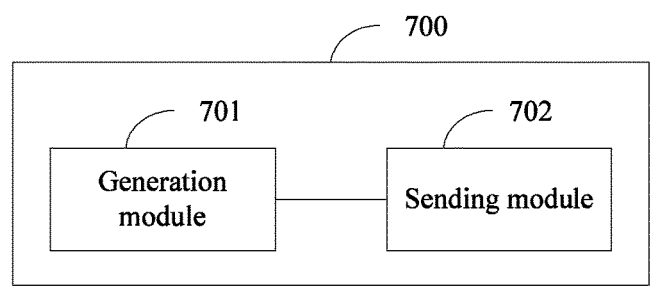
FIG. 7 is a functional structural diagram of a sending device according to an embodiment of the present application.

Referring to FIG. 7, this embodiment of the present application provides a sending device 700 for indicating a transmission frame structure. The sending device 700 is applied to a WLAN, and is particularly applied to a HEW. The sending device 700 may include a generation module 701 and a sending module 702.

The generation module 701 is configured to generate a transmission frame. A physical header of the transmission frame includes a frame structure indication field, and a subcarrier polarity of the frame structure indication field is used to indicate a frame structure of the transmission frame.

When the subcarrier polarity of the frame structure indication field is a first subcarrier polarity, the transmission frame has a first frame structure. When the subcarrier polarity of the frame structure indication field is a second subcarrier polarity, the transmission frame has a second frame structure.

The sending module 702 is configured to send the transmission frame, so that a receiving device determines the frame structure of the transmission frame according to the subcarrier polarity of the frame structure indication field.

In some embodiments of the present application, the frame structure indication field closely follows a legacy signal field L-SIG, and the generation module 701 may be specifically configured to generate a first transmission frame that has the first frame structure, or generate a second transmission frame that has the second frame structure.

In a physical header of the first transmission frame, there is a high efficiency wireless local area network first signal field HE-SIG-A after an L-SIG and before a high efficiency wireless local area network short training field HE-STF. The HE-SIG-A includes control indication information, and the control indication information is used to instruct the receiving device how to decode all or a part of fields in a part that is of the first transmission frame and after the HE-SIG-A. The first transmission frame is used to support a single user (SU) transmission mode, a single user multiple-input multiple-output (SU MIMO) transmission mode, and a downlink multi-user multiple-input multiple-output (DL MU MIMO) transmission mode.

In a physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose. The second transmission frame is used to support an uplink orthogonal frequency division multiple access UL OFDMA transmission mode.

The common information includes at least one of the following information: a network identifier, an identifier of the receiving device, or remaining transmission duration.

In some embodiments of the present application, the first transmission frame is further used to support a downlink orthogonal frequency division multiple access DL OFDMA transmission mode, or the second transmission frame is further used to support a DL OFDMA transmission mode.

In some embodiments of the present application, the first transmission frame is further used to support an uplink multi-user multiple-input multiple-output UL MU MIMO transmission mode, or the second transmission frame is further used to support a UL MU MIMO transmission mode.

In some embodiments of the present application, a high efficiency wireless local area network second signal field HE-SIG-B is further included after the HE-SIG-A of the first transmission frame and before the HE-STF of the first transmission frame. The HE-SIG-B includes control indication information, and the control indication information included in the HE-SIG-B is used to instruct the receiving device how to decode a part that is of the first transmission frame and after the HE-SIG-B.

In some embodiments of the present application, the HE-SIG-A or the HE-SIG-B of the first transmission frame further includes mode indication information, and the mode indication information is used to indicate a transmission mode specifically supported by the first transmission frame.

In some embodiments of the present application, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

In some embodiments of the present application, the generation module 701 is specifically configured to generate a first transmission frame that has the first frame structure, or generate a second transmission frame that has the second frame structure. After a frame structure indication field, the physical header of the first transmission frame includes a time domain repetition of a particular field. The physical header of the second transmission frame includes the particular field, but does not include the time domain repetition of the particular field.

In some embodiments of the present application, the particular field is an RE-SIG-A.

In some embodiments of the present application, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG.

The sending device in this embodiment of the present application may be a device, for example, a STA or an AP, and may be specifically a mobile phone, a tablet computer, a router, or the like.

It may be understood that, functions of function modules of the sending device in this embodiment of the present application may be specifically implemented according to the methods in the foregoing method embodiments. For a specific implementation process, reference may be made to related descriptions in the foregoing method embodiments, and details are not described herein.

It may be seen from the foregoing that, in some feasible implementation manners of the present application, in a technical solution, a subcarrier polarity of a frame structure indication field in a physical header of a transmission frame is used to indicate different frame structures, so as to obtain the following technical effects:

First, because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

Second, in some implementation manners, a frame structure indication field in a second frame structure includes only common information. In a scenario in which multiple devices perform sending, and one device performs receiving, frame structure indication fields in transmission frames sent by the multiple devices are the same, and may still be properly received and parsed after the frame structure indication fields superpose. Therefore, the second frame structure supports a scenario in which multiple devices perform sending, and one device performs receiving, and may be applied to a HEW into which any one or more of transmission modes in transmission modes of UL OFDMA, DL OFDMA, and UL MU MIMO are introduced.

Third, in some implementation manners, whether to perform time domain repetition on a particular field, for example, an HE-SIG-A, may be indicated by using a subcarrier polarity of a frame structure indication field. In some scenarios, the particular field is repeated to enhance reliability of the particular field, and in some other scenarios, the particular field is not repeated to reduce overheads.

Fourth, in some implementation manners, an expression manner of a subcarrier polarity is that a group of subcarriers are filled/phases of a group of subcarriers are rotated, and another group of subcarriers are vacant/phases of another group of subcarriers are not rotated. Because the expression manner has a higher identification degree, in comparison with an indication method in the related field, in this embodiment of the present application, a receiving device can more easily identify a structure of a transmission frame.

Embodiment 4

Figure 8:
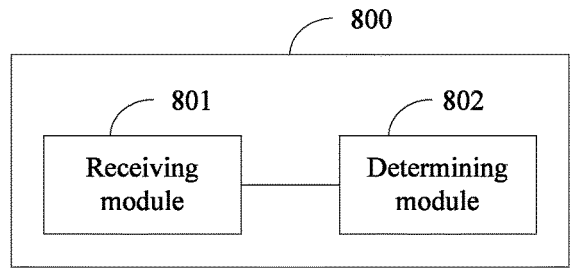
FIG. 8 is a functional structural diagram of a receiving device according to an embodiment of the present application.

Referring to FIG. 8, this embodiment of the present application provides a receiving device 800 for indicating a transmission frame structure. The receiving device 800 is applied to a WLAN, and is particularly applied to a HEW. The receiving device 800 may include:

a receiving module 801, configured to receive a physical header of a transmission frame sent by a sending device, where the physical header of the transmission frame includes a frame structure indication field, and a subcarrier polarity of the frame structure indication field is used to indicate a frame structure of the transmission frame; and a determining module 802, configured to determine the frame structure of the transmission frame according to the subcarrier polarity of the frame structure indication field, where when the subcarrier polarity of the frame structure indication field is a first subcarrier polarity, the transmission frame has a first frame structure, or when the subcarrier polarity of the frame structure indication field is a second subcarrier polarity, the transmission frame has a second frame structure.

In some embodiments of the present application, the frame structure indication field closely follows a legacy signal field L-SIG, and the receiving module 801 may be specifically configured to:

receive a physical header of a first transmission frame that is sent by the sending device and has the first frame structure or a physical header of a second transmission frame that is sent by the sending device and has the second frame structure.

In the physical header of the first transmission frame, there is a high efficiency wireless local area network first signal field HE-SIG-A after an L-SIG and before a high efficiency wireless local area network short training field HE-STF. The HE-SIG-A includes control indication information, and the control indication information is used to instruct the receiving device how to decode all or a part of fields in a part that is of the first transmission frame and after the HE-SIG-A. The first transmission frame is used to support a single user (SU) transmission mode, a single user multiple-input multiple-output (SU MIMO) transmission mode, and downlink multi-user multiple-input multiple-output (DL MU MIMO) mode.

In the physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose. The second transmission frame is used to support an uplink orthogonal frequency division multiple access UL OFDMA transmission mode.

The common information includes at least one of the following information: a network identifier, an identifier of the receiving device, or remaining transmission duration.

In some embodiments of the present application, the first transmission frame is further used to support a downlink orthogonal frequency division multiple access DL OFDMA transmission mode, or the second transmission frame is further used to support a DL OFDMA transmission mode.

In some embodiments of the present application, the first transmission frame is further used to support an uplink multi-user multiple-input multiple-output (UL MU MIMO) transmission mode, or the second transmission frame is further used to support a UL MU MIMO transmission mode.

In some embodiments of the present application, a high efficiency wireless local area network second signal field HE-SIG-B is further included after the HE-SIG-A of the first transmission frame and before the HE-STF of the first transmission frame. The HE-SIG-B includes control indication information, and the control indication information included in the HE-SIG-B is used to instruct the receiving device how to decode a part that is of the first transmission frame and after the HE-SIG-B.

In some embodiments of the present application, the HE-SIG-A or the HE-SIG-B of the first transmission frame further includes mode indication information, and the determining module 802 is further configured to determine, according to the mode indication information, a transmission mode specifically supported by the frame structure of the first transmission frame.

In some embodiments of the present application, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

In some embodiments of the present application, the receiving module 801 is specifically configured to:

receive, by the receiving device, a physical header of a first transmission frame that is sent by the sending device and has the first frame structure or a physical header of a second transmission frame that is sent by the sending device and has the second frame structure.

After a frame structure indication field, the physical header of the first transmission frame includes a time domain repetition of a particular field.

The physical header of the second transmission frame includes the particular field, but does not include the time domain repetition of the particular field.

In some embodiments of the present application, the particular field is an HE-SIG-A.

In some embodiments of the present application, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG; and the frame structure indication field in the second frame structure is all or a part of OFDM symbols of the HE-SIG-A, where the RL-SIG is a time domain repetition of the L-SIG The receiving device in this embodiment of the present application may be a device, for example, a STA or an AP, and may be specifically a mobile phone, a tablet computer, a router, or the like.

It may be understood that, functions of function modules of the receiving device in this embodiment of the present application may be specifically implemented according to the methods in the foregoing method embodiments. For a specific implementation process, reference may be made to related descriptions in the foregoing method embodiments, and details are not described herein.

It may be seen from the foregoing that, in some feasible implementation manners of the present application, in a technical solution, a subcarrier polarity of a frame structure indication field in a physical header of a transmission frame is used to indicate different frame structures, so as to obtain the following technical effects:

First, because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

Second, in some implementation manners, a frame structure indication field in a second frame structure includes only common information. In a scenario in which multiple devices perform sending, and one device performs receiving, frame structure indication fields in transmission frames sent by the multiple devices are the same, and may still be properly received and parsed after the frame structure indication fields superpose. Therefore, the second frame structure supports a scenario in which multiple devices perform sending, and one device performs receiving, and may be applied to a HEW into which any one or more of transmission modes in transmission modes of UL OFDMA, DL OFDMA, and UL MU MIMO are introduced.

Third, in some implementation manners, whether to perform time domain repetition on a particular field, for example, an HE-SIG-A, may be indicated by using a subcarrier polarity of a frame structure indication field. In some scenarios, the particular field is repeated to enhance reliability of the particular field, and in some other scenarios, the particular field is not repeated to reduce overheads.

Fourth, in some implementation manners, an expression manner of a subcarrier polarity is that a group of subcarriers are filled/phases of a group of subcarriers are rotated, and another group of subcarriers are vacant/phases of another group of subcarriers are not rotated. Because the expression manner has a higher identification degree, in comparison with an indication method in the related field, in this embodiment of the present application, a receiving device can more easily identify a structure of a transmission frame.

Embodiment 5

Figure 9:
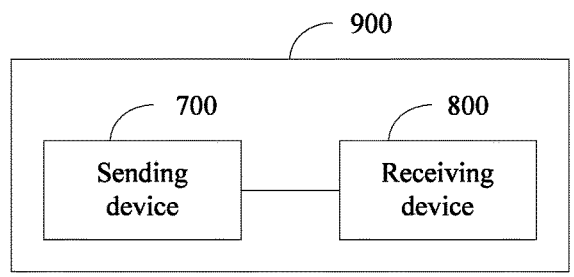
FIG. 9 is a schematic architectural diagram of a communications system according to an embodiment of the present application.

Referring to FIG. 9, this embodiment of the present application further provides a communications system 900, including: a sending device 700 and a receiving device 800. The sending device 700 may be the sending device shown in Embodiment 3, and the receiving device 800 may be the receiving device shown in FIG. 4. Specifically, The sending device 700 may include: a generation module 701, configured to generate a transmission frame, where a physical header of the transmission frame includes a frame structure indication field, a subcarrier polarity of the frame structure indication field is used to indicate a frame structure of the transmission frame, where when the subcarrier polarity of the frame structure indication field is a first subcarrier polarity, the transmission frame has a first frame structure, or when the subcarrier polarity of the frame structure indication field is a second subcarrier polarity, the transmission frame has a second frame structure; and a sending module 702, configured to send the transmission frame, so that the receiving device determines the frame structure of the transmission frame according to the subcarrier polarity of the frame structure indication field.

The receiving device 800 may include: a receiving module 801, configured to receive the physical header of the transmission frame sent by the sending device, where the physical header of the transmission frame includes the frame structure indication field, and the subcarrier polarity of the frame structure indication field is used to indicate the frame structure of the transmission frame; and a determining module 802, configured to determine the frame structure of the transmission frame according to the subcarrier polarity of the frame structure indication field, where when the subcarrier polarity of the frame structure indication field is the first subcarrier polarity, the transmission frame has the first frame structure, or when the subcarrier polarity of the frame structure indication field is the second subcarrier polarity, the transmission frame has the second frame structure.

In some embodiments of the present application, the frame structure indication field closely follows a legacy signal field L-SIG The generation module 701 may be specifically configured to generate a first transmission frame that has the first frame structure, or generate a second transmission frame that has the second frame structure. In a physical header of the first transmission frame, there is a high efficiency wireless local area network first signal field HE-SIG-A after an L-SIG and before a high efficiency wireless local area network short training field HE-STF. The HE-SIG-A includes control indication information, and the control indication information is used to instruct the receiving device how to decode all or a part of fields in a part that is of the first transmission frame and after the HE-SIG-A. The first transmission frame is used to support a single user (SU) transmission mode, a single user multiple-input multiple-output (SU MIMO) transmission mode, and a downlink multi-user multiple-input multiple-output (DL MU MIMO) transmission mode. In a physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose. The second transmission frame is used to support an uplink orthogonal frequency division multiple access (UL OFDMA) transmission mode. The common information includes at least one of the following information: a network identifier, an identifier of the receiving device, or remaining transmission duration.

The receiving module 801 may be specifically configured to receive the physical header of the first transmission frame that is sent by the sending device and has the first frame structure or the physical header of the second transmission frame that is sent by the sending device and has the second frame structure. In the physical header of the first transmission frame, there is the high efficiency wireless local area network first signal field HE-SIG-A after the L-SIG and before the high efficiency wireless local area network short training field HE-STF. The HE-SIG-A includes the control indication information, and the control indication information is used to instruct the receiving device how to decode all or a part of fields in the part that is of the first transmission frame and after the HE-SIG-A. The first transmission frame is used to support the single user (SU) transmission mode, the single user multiple-input multiple-output (SU MIMO) transmission mode, and the downlink multi-user multiple-input multiple-output (DL MU MIMO) mode. In the physical header of the second transmission frame, there is no HE-SIG-A after the L-SIG and before the HE-STF, or there is an HE-SIG-A, but the HE-SIG-A includes only the common information, so that decoding can still be performed after the HE-SIG-As in the second transmission frames sent by the multiple sending devices superpose. The second transmission frame is used to support the uplink orthogonal frequency division multiple access (UL OFDMA) transmission mode. The common information includes at least one of the following information: the network identifier, the identifier of the receiving device, or the remaining transmission duration.

In some embodiments of the present application, the first transmission frame is further used to support a downlink orthogonal frequency division multiple access (DL OFDMA) transmission mode, or the second transmission frame is further used to support a DL OFDMA transmission mode.

In some embodiments of the present application, the first transmission frame is further used to support an uplink multi-user multiple-input multiple-output (UL MU MIMO) transmission mode, or the second transmission frame is further used to support a UL MU MIMO transmission mode.

In some embodiments of the present application, a high efficiency wireless local area network second signal field HE-SIG-B is further included after the HE-SIG-A of the first transmission frame and before the HE-STF of the first transmission frame. The HE-SIG-B includes control indication information, and the control indication information included in the HE-SIG-B is used to instruct the receiving device how to decode a part that is of the first transmission frame and after the HE-SIG-B.

In some embodiments of the present application, the HE-SIG-A or the HE-SIG-B of the first transmission frame further includes mode indication information, and the mode indication information is used to indicate a transmission mode specifically supported by the first transmission frame.

In some embodiments of the present application, the generation module 701 may be specifically configured to generate a first transmission frame that has the first frame structure, or generate a second transmission frame that has the second frame structure. After a frame structure indication field, a physical header of the first transmission frame includes a time domain repetition of a particular field. A physical header of the second transmission frame includes the particular field, but does not include the time domain repetition of the particular field. Optionally, the particular field is an HE-SIG-A.

The receiving module 801 may be specifically configured to receive, by the receiving device, the physical header of the first transmission frame that is sent by the sending device and has the first frame structure or the physical header of the second transmission frame that is sent by the sending device and has the second frame structure. After the frame structure indication field, the physical header of the first transmission frame includes the time domain repetition of the particular field. The physical header of the second transmission frame includes the particular field, but does not include the time domain repetition of the particular field. Optionally, the particular field is the HE-SIG-A.

In some embodiments of the present application, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG.

In some embodiments of the present application, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

It may be seen from the foregoing that, in some feasible implementation manners of the present application, in a technical solution, a subcarrier polarity of a frame structure indication field in a physical header of a transmission frame is used to indicate different frame structures, so as to obtain the following technical effects:

First, because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

Second, in some implementation manners, a frame structure indication field in a second frame structure includes only common information. In a scenario in which multiple devices perform sending, and one device performs receiving, frame structure indication fields in transmission frames sent by the multiple devices are the same, and may still be properly received and parsed after the frame structure indication fields superpose. Therefore, the second frame structure supports a scenario in which multiple devices perform sending, and one device performs receiving, and may be applied to a HEW into which any one or more of transmission modes in transmission modes of UL OFDMA, DL OFDMA, and UL MU MIMO are introduced.

Third, in some implementation manners, whether to perform time domain repetition on a particular field, for example, an HE-SIG-A, may be indicated by using a subcarrier polarity of a frame structure indication field. In some scenarios, the particular field is repeated to enhance reliability of the particular field, and in some other scenarios, the particular field is not repeated to reduce overheads.

Fourth, in some implementation manners, an expression manner of a subcarrier polarity is that a group of subcarriers are filled/phases of a group of subcarriers are rotated, and another group of subcarriers are vacant/phases of another group of subcarriers are not rotated. Because the expression manner has a higher identification degree, in comparison with an indication method in the related field, in this embodiment of the present application, a receiving device can more easily identify a structure of a transmission frame.

Embodiment 6

Figure 10:
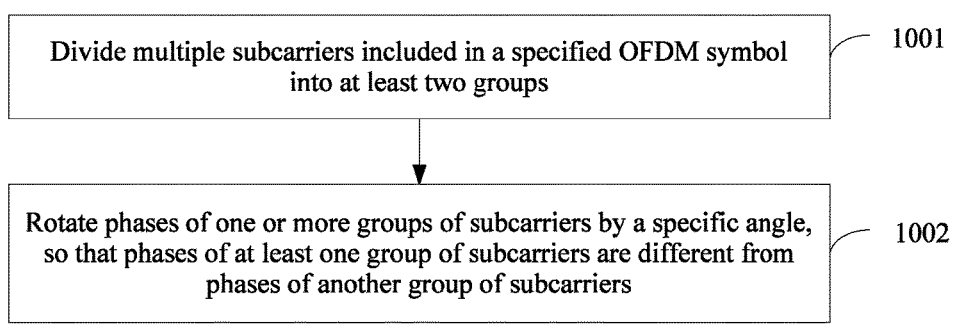
FIG. 10 is a flow diagram of a subcarrier polarity expression method according to an embodiment of the present application.

Referring to FIG. 10, this embodiment of the present application further provides a subcarrier polarity expression method. The method may include the following steps:

1001. Divide multiple subcarriers included in a specified OFDM symbol into at least two groups.

The division may be performed in any manner. For example, all odd-numbered subcarriers are put into a first group, and all even-numbered subcarriers are put into a send group.

1002. Rotate phases of one or more groups of subcarriers by a specific angle, so that phases of at least one group of subcarriers are different from phases of another group of subcarriers.

A phase of a subcarrier may be rotated by any angle, for example, 90 degrees, 45 degrees, or 75 degrees.

Phases of some subcarriers in the multiple subcarriers included in the specified OFDM symbol are rotated, so that the specified OFDM symbol may express multiple subcarrier polarities. The multiple subcarrier polarities may be used to indicate multiple types of information, for example, multiple transmission frame structures or whether a transmission frame includes some particular information, for example, a time domain repetition of a particular field (for example, an HE-SIG-A). Information indicated by using a subcarrier polarity is not limited in this specification.

This method not only may be used to indicate different transmission frame structures by using different subcarrier polarities, but also may be used for similar frame structure identification in an existing 802.11 standard. It may be stipulated that phases of some subcarriers in the first symbol after an L-SIG of a HEW frame structure are rotated, while some are not rotated, which is similar to the existing standard. For example, when phases of odd-numbered subcarriers are rotated by 90 degrees, and phases of even-numbered subcarriers are not rotated, it is indicated that the frame is a HEW frame. In comparison with an existing method in which phase rotation is performed on all subcarriers, this method has a higher identification degree.

An embodiment of the present application further provides a computer storage medium. The computer storage medium may store a program. When being executed, the program includes all or a part of steps of the method for indicating a transmission frame structure that are recorded in the foregoing method embodiments.

Figure 11:
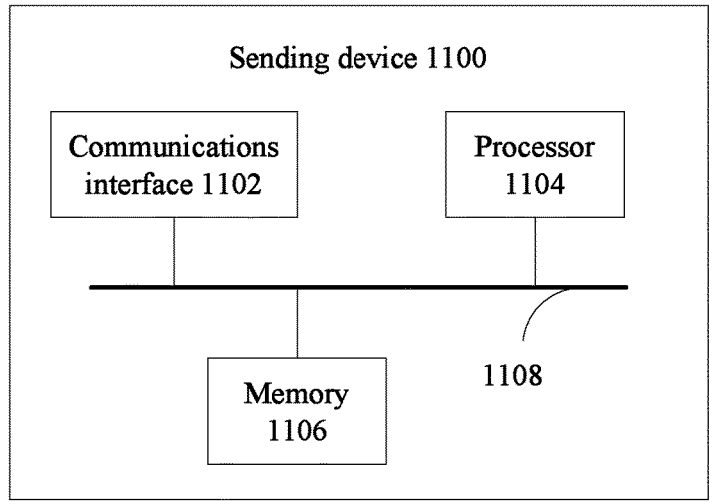
FIG. 11 is a schematic structural diagram of a sending device according to an embodiment of the present application.

Referring to FIG. 11, an embodiment of the present application further provides a sending device 1100.

The sending device 1100 may be a computer with a microprocessor. For example, the sending device 1100 may be a portable device such as a general-purpose computer, a customized machine, a mobile phone terminal, or a tablet machine. The sending device 1100 includes: a processor 1104, a memory 1106, a communications interface 1102, and a bus 1108. By using the bus 1108, the processor 1104, the memory 1106, and the communications interface 1102 are connected to each other and communicate with each other.

The bus 1108 may be an industry standard architecture (ISA) bus, a peripheral component interconnect (PCI) bus, an extended industry standard architecture (EISA) bus, or the like. The bus may be classified as one or more of an address bus, a data bus, a control bus, and the like. For ease of indication, the bus is represented by using only one thick line in FIG. 11. However, it does not indicate that there is only one bus or only one type of buses.

The memory 1106 is configured to store executable program code. The program code includes a computer operation instruction. When the sending device 1100 executes the program code, the sending device 1100 may complete steps 301 and 302 in Embodiment 1, and may also implement all functions of the sending device 700 in Embodiment 3. The memory 1106 may include a high-speed random access memory (RAM). Optionally, the memory 1106 may further include a non-volatile memory. For example, the memory 1106 may include a magnetic disk memory.

The processor 1104 may include one or more central processing units (CPUs), or the processor 1104 may be an application-specific integrated circuit (ASIC), or the processor 1104 may be one or more integrated circuits configured to implement this embodiment of the present application.

The processor 1104 is configured to generate a transmission frame. A physical header of the transmission frame includes a frame structure indication field, and a subcarrier polarity of the frame structure indication field is used to indicate a frame structure of the transmission frame. When the subcarrier polarity of the frame structure indication field is a first subcarrier polarity, the transmission frame has a first frame structure. When the subcarrier polarity of the frame structure indication field is a second subcarrier polarity, the transmission frame has a second frame structure.

The communications interface 1102 may be a transceiver and is configured to send the transmission frame, so that a receiving device determines the frame structure of the transmission frame according to the subcarrier polarity of the frame structure indication field.

Optionally, the processor 1104 is further configured to generate a first transmission frame that has the first frame structure, or generate a second transmission frame that has the second frame structure.

In a physical header of the first transmission frame, there is a high efficiency wireless local area network first signal field HE-SIG-A after an L-SIG and before a high efficiency wireless local area network short training field HE-STF. The HE-SIG-A includes control indication information, and the control indication information is used to instruct the receiving device how to decode all or a part of fields in a part that is of the first transmission frame and after the HE-SIG-A. The first transmission frame is used to support a single user (SU) transmission mode, a single user multiple-input multiple-output (SU MIMO) transmission mode, and a downlink multi-user multiple-input multiple-output (DL MU MIMO) transmission mode.

In a physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose. The second transmission frame is used to support an uplink orthogonal frequency division multiple access (UL OFDMA) transmission mode.

Optionally, the common information includes at least one of the following information: a network identifier, an identifier of the receiving device, or remaining transmission duration.

Optionally, the first transmission frame is further used to support a downlink orthogonal frequency division multiple access (DL OFDMA) transmission mode, or the second transmission frame is further used to support a DL OFDMA transmission mode.

Optionally, the first transmission frame is further used to support an uplink multi-user multiple-input multiple-output (UL MU MIMO) transmission mode, or the second transmission frame is further used to support a UL MU MIMO transmission mode.

Optionally, a high efficiency wireless local area network second signal field HE-SIG-B is further included after the HE-SIG-A of the first transmission frame and before the HE-STF of the first transmission frame. The HE-SIG-B includes control indication information, and the control indication information included in the HE-SIG-B is used to instruct the receiving device how to decode a part that is of the first transmission frame and after the HE-SIG-B.

Optionally, the HE-SIG-A or the HE-SIG-B of the first transmission frame further includes mode indication information, and the mode indication information is used to indicate a transmission mode specifically supported by the first transmission frame.

Optionally, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

Optionally, the processor 1104 is further configured to generate a first transmission frame that has the first frame structure, or generate a second transmission frame that has the second frame structure.

After a frame structure indication field, a physical header of the first transmission frame includes a time domain repetition of a particular field.

A physical header of the second transmission frame includes the particular field, but does not include the time domain repetition of the particular field.

Optionally, the particular field is an HE-SIG-A.

Optionally, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG It should be noted that, functional units of the sending device provided in this embodiment of the present application may be based on specific implementation of the method provided in Embodiment 1 and that of functions that the device provided in Embodiment 3 has. Definitions and descriptions of terms are consistent with those in Embodiment 1 and Embodiment 3, and details are not described herein.

According to the sending device provided in this embodiment of the present application, a subcarrier polarity of a frame structure indication field in a physical header of a transmission frame is used to indicate different frame structures, so as to obtain the following technical effects:

First, because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

Second, in some implementation manners, a frame structure indication field in a second frame structure includes only common information. In a scenario in which multiple devices perform sending, and one device performs receiving, frame structure indication fields in transmission frames sent by the multiple devices are the same, and may still be properly received and parsed after the frame structure indication fields superpose. Therefore, the second frame structure supports a scenario in which multiple devices perform sending, and one device performs receiving, and may be applied to a HEW into which any one or more of transmission modes in transmission modes of UL OFDMA, DL OFDMA, and UL MU MIMO are introduced.

Third, in some implementation manners, whether to perform time domain repetition on a particular field, for example, an HE-SIG-A, may be indicated by using a subcarrier polarity of a frame structure indication field. In some scenarios, the particular field is repeated to enhance reliability of the particular field, and in some other scenarios, the particular field is not repeated to reduce overheads.

Fourth, in some implementation manners, an expression manner of a subcarrier polarity is that a group of subcarriers are filled/phases of a group of subcarriers are rotated, and another group of subcarriers are vacant/phases of another group of subcarriers are not rotated. Because the expression manner has a higher identification degree, in comparison with an indication method in the related field, in this embodiment of the present application, a receiving device can more easily identify a structure of a transmission frame.

Figure 12:
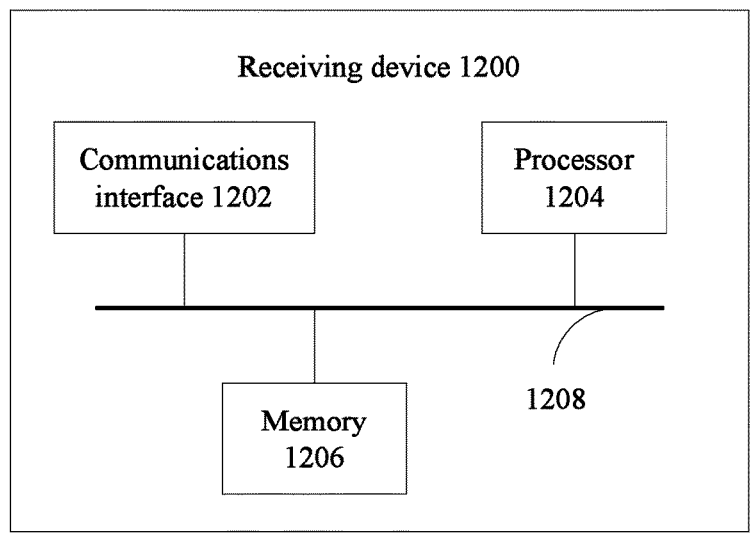
FIG. 12 is a schematic structural diagram of a receiving device according to an embodiment of the present application.

Referring to FIG. 12, an embodiment of the present application further provides a receiving device 1200.

The receiving device 1200 may be a computer with a microprocessor. For example, the receiving device 1200 may be a portable device such as a general-purpose computer, a customized machine, a mobile phone terminal, or a tablet machine. The receiving device 1200 includes: a processor 1204, a memory 1206, a communications interface 1202, and a bus 1208. By using the bus 1208, the processor 1204, the memory 1206, and the communications interface 1202 are connected to each other and communicate with each other.

The bus 1208 may be an industry standard architecture (ISA) bus, a peripheral component interconnect (PCI) bus, an extended industry standard architecture (EISA) bus, or the like. The bus may be classified as one or more of an address bus, a data bus, a control bus, and the like. For ease of indication, the bus is represented by using only one thick line in FIG. 12. However, it does not indicate that there is only one bus or only one type of buses.

The memory 1206 is configured to store executable program code. The program code includes a computer operation instruction. When the receiving device 1200 executes the program code, the receiving device 1200 may complete steps 601 and 602 in Embodiment 2, and may also implement all functions of the receiving device 800 in Embodiment 4. The memory 1206 may include a high-speed random access memory (RAM). Optionally, the memory 1206 may further include a non-volatile memory. For example, the memory 1206 may include a magnetic disk memory.

The processor 1204 may be a central processing unit (CPU), or the processor 1204 may be an application-specific integrated circuit (ASIC), or the processor 1204 may be one or more integrated circuits configured to implement this embodiment of the present application.

The communications interface 1202 may be a transceiver and is configured to receive a physical header of a transmission frame sent by a sending device. The physical header of the transmission frame includes a frame structure indication field, and a subcarrier polarity of the frame structure indication field is used to indicate a frame structure of the transmission frame.

The processor 1204 is configured to determine the frame structure of the transmission frame according to the subcarrier polarity of the frame structure indication field. When the subcarrier polarity of the frame structure indication field is a first subcarrier polarity, the transmission frame has a first frame structure. When the subcarrier polarity of the frame structure indication field is a second subcarrier polarity, the transmission frame has a second frame structure.

Optionally, the frame structure indication field closely follows a legacy signal field L-SIG. The communications interface 1202 is further configured to receive a physical header of a first transmission frame that is sent by the sending device and has the first frame structure or a physical header of a second transmission frame that is sent by the sending device and has the second frame structure.

In the physical header of the first transmission frame, there is a high efficiency wireless local area network first signal field HE-SIG-A after an L-SIG and before a high efficiency wireless local area network short training field HE-STF. The HE-SIG-A includes control indication information, and the control indication information is used to instruct the receiving device how to decode all or a part of fields in a part that is of the first transmission frame and after the HE-SIG-A. The first transmission frame is used to support a single user (SU) transmission mode, a single user multiple-input multiple-output (SU MIMO) transmission mode, and downlink multi-user multiple-input multiple-output (DL MU MIMO) transmission mode.

In the physical header of the second transmission frame, there is no HE-SIG-A after an L-SIG and before an HE-STF, or there is an HE-SIG-A, but the HE-SIG-A includes only common information, so that decoding can still be performed after HE-SIG-As in second transmission frames sent by multiple sending devices superpose. The second transmission frame is used to support an uplink orthogonal frequency division multiple access (UL OFDMA) transmission mode.

Optionally, the common information includes at least one of the following information: a network identifier, an identifier of the receiving device, or remaining transmission duration.

Optionally, the first transmission frame is further used to support a downlink orthogonal frequency division multiple access (DL OFDMA) transmission mode, or the second transmission frame is further used to support a DL OFDMA transmission mode.

Optionally, the first transmission frame is further used to support an uplink multi-user multiple-input multiple-output (UL MU MIMO) transmission mode, or the second transmission frame is further used to support a UL MU MIMO transmission mode.

Optionally, a high efficiency wireless local area network second signal field HE-SIG-B is further included after the HE-SIG-A of the first transmission frame and before the HE-STF of the first transmission frame. The HE-SIG-B includes control indication information, and the control indication information included in the HE-SIG-B is used to instruct the receiving device how to decode a part that is of the first transmission frame and after the HE-SIG-B.

Optionally, the HE-SIG-A or the HE-SIG-B of the first transmission frame further includes mode indication information, and the processor 1204 is further configured to determine, according to the mode indication information, a transmission mode specifically supported by the frame structure of the first transmission frame.

Optionally, the first subcarrier polarity means that phases of a first group of subcarriers in multiple subcarriers included in the frame structure indication field are rotated by a first angle, and phases of a second group of subcarriers are rotated by a second angle; and the second subcarrier polarity means that the phases of the first group of subcarriers in the multiple subcarriers included in the frame structure indication field are rotated by the second angle, and the phases of the second group of subcarriers are rotated by the first angle, where the second angle is greater than the first angle, and the first angle is greater than or equal to 0 degree; or the first subcarrier polarity means that a first group of subcarriers in multiple subcarriers included in the frame structure indication field are filled, and a second group of subcarriers are vacant; and the second subcarrier polarity means that the first group of subcarriers in the multiple subcarriers included in the frame structure indication field are vacant, and the second group of subcarriers are filled; or the first subcarrier polarity means that phases of all subcarriers included in the frame structure indication field are rotated by a third angle, and the second subcarrier polarity means that the phases of all the subcarriers included in the frame structure indication field are rotated by a fourth angle, where the fourth angle is greater than the third angle, and the third angle is greater than 0 degree.

Optionally, the communications interface 1202 is further configured to receive a physical header of a first transmission frame that is sent by the sending device and has the first frame structure or a physical header of a second transmission frame that is sent by the sending device and has the second frame structure.

After a frame structure indication field, the physical header of the first transmission frame includes a time domain repetition of a particular field.

The physical header of the second transmission frame includes the particular field, but does not include the time domain repetition of the particular field.

Optionally, the particular field is an HE-SIG-A.

Optionally, the frame structure indication field closely follows a legacy signal field L-SIG; and the frame structure indication field in the first frame structure and that in the second frame structure both are RL-SIGs, where the RL-SIG is a time domain repetition of the L-SIG; or the frame structure indication field in the first frame structure is all or a part of OFDM symbols of the HE-SIG-A, and the frame structure indication field in the second frame structure is an RL-SIG, where the RL-SIG is a time domain repetition of the L-SIG; or the frame structure indication field in the first frame structure is all or a part of OFDM symbols of the HE-SIG-A, and the frame structure indication field in the second frame structure is all or a part of OFDM symbols of the HE-SIG-A; or the frame structure indication field in the first frame structure is an RL-SIG, and the frame structure indication field in the second frame structure is all or a part of OFDM symbols of the HE-SIG-A, where the RL-SIG is a time domain repetition of the L-SIG It should be noted that, functional units of the receiving device provided in this embodiment of the present application may be based on specific implementation of the method provided in Embodiment 2 and that of functions that the device provided in Embodiment 4 has. Definitions and descriptions of terms are consistent with those in Embodiment 2 and Embodiment 4, and details are not described herein.

According to the receiving device provided in this embodiment of the present application, a frame structure of a transmission frame is determined by using a subcarrier polarity of a frame structure indication field in a received physical header of the transmission frame, so as to obtain the following technical effects:

First, because a subcarrier polarity may have more expression manners, and may be used to indicate more frame structures, design of multiple frame structures in a WLAN standard is supported, so as to satisfy a requirement that a HEW needs to support more transmission modes, support more frame structures, and indicate more frame structures.

Second, in some implementation manners, a frame structure indication field in a second frame structure includes only common information. In a scenario in which multiple devices perform sending, and one device performs receiving, frame structure indication fields in transmission frames sent by the multiple devices are the same, and may still be properly received and parsed after the frame structure indication fields superpose. Therefore, the second frame structure supports a scenario in which multiple devices perform sending, and one device performs receiving, and may be applied to a HEW into which any one or more of transmission modes in transmission modes of UL OFDMA, DL OFDMA, and UL MU MIMO are introduced.

Third, in some implementation manners, whether to perform time domain repetition on a particular field, for example, an HE-SIG-A, may be indicated by using a subcarrier polarity of a frame structure indication field. In some scenarios, the particular field is repeated to enhance reliability of the particular field, and in some other scenarios, the particular field is not repeated to reduce overheads.

Fourth, in some implementation manners, an expression manner of a subcarrier polarity is that a group of subcarriers are filled/phases of a group of subcarriers are rotated, and another group of subcarriers are vacant/phases of another group of subcarriers are not rotated. Because the expression manner has a higher identification degree, in comparison with an indication method in the related field, in this embodiment of the present application, a receiving device can more easily identify a structure of a transmission frame.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present application is not limited to the described sequence of the actions, because some steps may be performed in another sequence or performed at the same time according to the present application. In addition, a person skilled in the art should also understand that all the embodiments described in the specification are exemplary embodiments, and the related actions and modules are not necessarily mandatory to the present application.

A person of ordinary skill in the art may understand that all or some of the steps of the methods in the foregoing embodiments may be implemented by instructing relevant hardware by a program. The program may be stored in a computer readable storage medium. The storage medium may include: a ROM, a RAM, a magnetic disk, or an optical disc.

The method and device for indicating a transmission frame structure, and a system provided in the embodiments of the present application are described in detail in the foregoing. Principles and implementation manners of the present application are described by using specific examples in this specification. The descriptions about the embodiments are merely intended to help understand the method and core ideas of the present application. In addition, a person of ordinary skill in the art can make modifications to a specific implementation manner and an application scope according to the ideas of the present application. In conclusion, the content of this specification shall not be construed as a limitation on the present application.

What is claimed is:

1. A method for indicating transmission frame structure in a wireless local area network, comprising:
generating, by a sending device, a transmission frame, wherein the transmission frame comprises a physical header, the physical header comprises a frame structure indication, and a subcarrier polarity of the frame structure indication indicates a frame structure of the transmission frame; and
sending, by the sending device, the transmission frame to a receiving device,
wherein a first subcarrier polarity of the frame structure indication indicates that the transmission frame has a first frame structure, and a second subcarrier polarity of the frame structure indication indicates that the transmission frame has a second frame structure;
wherein, for the first frame structure, the physical header of the transmission frame comprises a field and a time domain repetition of the field; and, for the second frame structure, the physical header of the transmission frame comprises the field but does not comprise the time domain repetition of the field; and
wherein, in the physical header, the frame structure indication is an orthogonal frequency division multiplexing (OFDM) symbol after a legacy signal field and a time domain repetition of the legacy signal field.

2. The method according to claim 1, wherein the field is a first high efficiency wireless local area network signal (HE-SIG-A) field.

3. The method according to claim 2, wherein for the second frame structure, the frame structure indication is an OFDM symbol of the HE-SIG-A field, and, in the physical header, the HE-SIG-A field is after the legacy signal field and the time domain repetition of the legacy signal field.

4. The method according to claim 1, wherein, in the transmission frame of the first frame structure, the time domain repetition of the field is after the frame structure indication.

5. The method according to claim 1, wherein the OFDM symbol corresponds to a plurality of subcarriers, wherein the first subcarrier polarity is that phases of the subcarriers are rotated by 90 degrees, and wherein the second subcarrier polarity is that the phases of the subcarriers are not rotated.

6. The method according to claim 1, wherein, for the first frame structure, the frame structure indication is an OFDM symbol of the time domain repetition of the field, and, for the second frame structure, the frame structure indication is an OFDM symbol of the field.

7. A method for determining a transmission frame structure in a wireless local area network, comprising:
receiving, by a receiving device, a transmission frame from a sending device, wherein the transmission frame comprises a physical header, the physical header comprises a frame structure indication, and a subcarrier polarity of the frame structure indication indicates a frame structure of the transmission frame; and
determining, by the receiving device, the frame structure of the transmission frame according to the subcarrier polarity of the frame structure indication,
wherein a first subcarrier polarity of the frame structure indication indicates that the transmission frame has a first frame structure, and a second subcarrier polarity of the frame structure indication indicates that the transmission frame has a second frame structure;

wherein, for the first frame structure, the physical header of the transmission frame comprises a field and a time domain repetition of the field; and, for the second frame structure, the physical header of the transmission frame comprises the field but does not comprise the time domain repetition of the field; and wherein, in the physical header, the frame structure indication is an orthogonal frequency division multiplexing (OFDM) symbol after a legacy signal field and a time domain repetition of the legacy signal field.

8. The method according to claim 7, wherein the field is a first high efficiency wireless local area network signal (HE-SIG-A) field.

9. The method according to claim 8, wherein for the second frame structure, the frame structure indication is an OFDM symbol of the HE-SIG-A field, and, in the physical header, the HE-SIG-A field is after the legacy signal field and the time domain repetition of the legacy signal field.

10. The method according to claim 7, wherein, for the first frame structure, the frame structure indication is an OFDM symbol of the time domain repetition of the field, and, for the second frame structure, the frame structure indication is an OFDM symbol of the field.

11. A sending device in a wireless local area network, comprising:
    a processor and a transmitter;
wherein the processor is configured to:
    generate a transmission frame, wherein the transmission frame comprises a physical header, the physical header comprises a frame structure indication, and a subcarrier polarity of the frame structure indication indicates a frame structure of the transmission frame,
wherein the transmitter is configure to:
    send the transmission frame to a receiving device,
wherein a first subcarrier polarity of the frame structure indication indicates that the transmission frame has a first frame structure, and a second subcarrier polarity of the frame structure indication indicates that the transmission frame has a second frame structure;

wherein, for the first frame structure, the physical header of the transmission frame comprises a field and a time domain repetition of the field; and, for the second frame structure, the physical header of the transmission frame comprises the field but does not comprise the time domain repetition of the field; and wherein, in the physical header, the frame structure indication is an orthogonal frequency division multiplexing (OFDM) symbol after a legacy signal field and a time domain repetition of the legacy signal field.

12. The sending device according to claim 11, wherein the field is a first high efficiency wireless local area network signal (HE-SIG-A) field.

13. The sending device according to claim 12, wherein for the second frame structure, the frame structure indication is an OFDM symbol of the HE-SIG-A field, and, in the physical header, the HE-SIG-A field is after the legacy signal field and the time domain repetition of the legacy signal field.

14. The sending device according to claim 11, wherein, in the transmission frame of the first frame structure, the time domain repetition of the field is after the frame structure indication.

15. The sending device according to claim 11, wherein, for the first frame structure, the frame structure indication is an OFDM symbol of the time domain repetition of the field, and, for the second frame structure, the frame structure indication is an OFDM symbol of the field.

16. The sending device according to claim 11, wherein the transmission frame is a 802.11ax (802.11HEW) frame.

17. A receiving device in a wireless local area network, comprising:
    a receiver and a processor;
wherein the receiver is configured to:
    receive a transmission frame from a sending device, wherein the transmission frame comprises a physical header, the physical header comprises a frame structure indication, and a subcarrier polarity of the frame structure indication indicates a frame structure of the transmission frame;
wherein the processor is configured to:
    determine the frame structure of the transmission frame according to the subcarrier polarity of the frame structure indication,
wherein a first subcarrier polarity of the frame structure indication indicates that the transmission frame has a first frame structure, and a second subcarrier polarity of the frame structure indication indicates that the transmission frame has a second frame structure;

wherein, for the first frame structure, the physical header of the transmission frame comprises a field and a time domain repetition of the field; and, for the second frame structure, the physical header of the transmission frame comprises the field but does not comprise the time domain repetition of the field; and wherein, in the physical header, the frame structure indication is an orthogonal frequency division multiplexing (OFDM) symbol after a legacy signal field and a time domain repetition of the legacy signal field.

18. The receiving device according to claim 17, wherein the field is a first high efficiency wireless local area network signal (HE-SIG-A) field.

19. The receiving device according to claim 18, wherein for the second frame structure, the frame structure indication is an OFDM symbol of the HE-SIG-A field, and, in the physical header, the HE-SIG-A field is after the legacy signal field and the time dimain repetition of the legacy signal field.

20. The receiving device according to claim 17, wherein the OFDM symbol corresponds to a plurality of subcarriers, wherein the first subcarrier polarity is that phases of the subcarriers are rotated by 90 degrees, and wherein the second subcarrier polarity is that the phases of the subcarriers are not rotated.

21. The receiving device according to claim 17, wherein, for the first frame structure, the frame structure indication is an OFDM symbol of the time domain repetition of the field, and, for the second frame structure, the frame structure indication is an OFDM symbol of the field.

22. The receiving device according to claim 17, wherein the transmission frame is a 802.11ax (802.11HEW) frame.

* * * * *